US012584758B2

(12) United States Patent
Ogata et al.

(10) Patent No.: US 12,584,758 B2
(45) Date of Patent: Mar. 24, 2026

(54) VEHICLE DISPLAY DEVICE, VEHICLE DISPLAY PROCESSING METHOD, AND NON-TRANSITORY STORAGE MEDIUM

(71) Applicant: TOYOTA JIDOSHA KABUSHIKI KAISHA, Toyota (JP)

(72) Inventors: Ryo Ogata, Toyota (JP); Kento Nagashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 17/884,737

(22) Filed: Aug. 10, 2022

(65) Prior Publication Data

US 2023/0106909 A1    Apr. 6, 2023

(30) Foreign Application Priority Data

Oct. 4, 2021    (JP) ................................. 2021-163602

(51) Int. Cl.
| | |
|---|---|
| *G01C 21/36* | (2006.01) |
| *B60K 35/10* | (2024.01) |
| *B60K 35/22* | (2024.01) |
| *B60K 35/23* | (2024.01) |
| *B60K 35/28* | (2024.01) |
| *B60K 35/50* | (2024.01) |

(Continued)

(52) U.S. Cl.
CPC ............ *G01C 21/365* (2013.01); *B60K 35/10* (2024.01); *B60K 35/22* (2024.01); *B60K 35/23* (2024.01); *B60K 35/50* (2024.01); *B60K 35/60* (2024.01); *G09G 3/002* (2013.01); *B60K 35/28* (2024.01); *B60K 2360/166* (2024.01); *G09G 2380/10* (2013.01)

(58) Field of Classification Search
CPC .............. G01C 21/365; G01C 21/3626; G01C 21/3691; B60K 35/00; B60K 35/23; B60K 35/28; B60K 2360/166; B60K 35/10; B60K 2360/1523; B60K 35/22; G09G 3/002; G09G 2380/10; G09G 5/37
USPC ........................... 701/437, 409, 412; 345/14
See application file for complete search history.

(56) References Cited

U.S. PATENT DOCUMENTS

2006/0012715 A1\*  1/2006  Abe ............... H04N 21/440263
2009/0112462 A1\*  4/2009  Lo ...................... G01C 21/3632
(Continued)

FOREIGN PATENT DOCUMENTS

JP      2009-031802 A     2/2009
JP      2015-176338 A    10/2015
(Continued)

*Primary Examiner* — Adam R Mott
*Assistant Examiner* — Ellis B. Ramirez
(74) *Attorney, Agent, or Firm* — OLIFF PLC.

(57) ABSTRACT

A vehicle display device comprises a display section, a control section. The display section is provided inside a vehicle cabin and includes a display area capable of displaying an image. The control section includes a memory and a processor coupled to the memory. The processor is configured to cause a plurality of plans scheduled for execution by a vehicle to be displayed in the display area in a row in scheduled execution sequence, and to cause a top plan that is a plan having an earliest scheduled execution from out of the plurality of plans to disappear by fade-out processing in the display area when a prescribed condition related to the top plan has been satisfied.

20 Claims, 30 Drawing Sheets

(51) Int. Cl.
  *B60K 35/60* (2024.01)
  *G09G 3/00* (2006.01)

(56) References Cited

U.S. PATENT DOCUMENTS

| | | | | |
|---|---|---|---|---|
| 2009/0231276 A1* | 9/2009 | Ullrich | ................. | G10H 1/0008 |
| 2016/0116297 A1* | 4/2016 | Faaborg | ............. | G06K 15/1843 |
| | | | | 701/428 |
| 2019/0204827 A1* | 7/2019 | Bhalla | ............... | B60W 60/0051 |
| 2021/0162865 A1* | 6/2021 | Ogata | ................... | G06F 3/1431 |
| 2021/0372810 A1* | 12/2021 | Hato | ........................ | G09G 5/38 |
| 2022/0063407 A1* | 3/2022 | Takabatake | ........... | G06F 3/1423 |
| 2023/0356588 A1* | 11/2023 | Oki | .......................... | G09G 5/36 |

FOREIGN PATENT DOCUMENTS

| | | | | | |
|---|---|---|---|---|---|
| JP | 2016-095173 A | | 5/2016 | | |
| JP | 2018-100867 A | | 6/2018 | | |
| JP | 2019-202556 A | | 11/2019 | | |
| JP | 2021-88222 A | | 6/2021 | | |
| KR | 20180053290 A | * | 5/2018 | ............. | B60K 28/02 |
| KR | 20190110482 A | * | 9/2019 | ............. | B60W 50/14 |

* cited by examiner

COMMUNICATION
SECTION ⎯50

JOURNEY PLAN
SETTING SECTION ⎯52

AUTONOMOUS DRIVING
CONTROL SECTION ⎯54

FIRST DISPLAY
INSTRUCTION SECTION ⎯56

SECOND DISPLAY
INSTRUCTION SECTION ⎯58

EMPHASIS DISPLAY
SECTION ⎯60

FIRST DETERMINATION
SECTION ⎯62

SECOND DETERMINATION
SECTION ⎯64

P4  ASSIST  1.5km

P3  ASSIST  700m

P2  MANUAL  100m

VB  58 km/h

VA  SET 120 km/h

Figure 8:
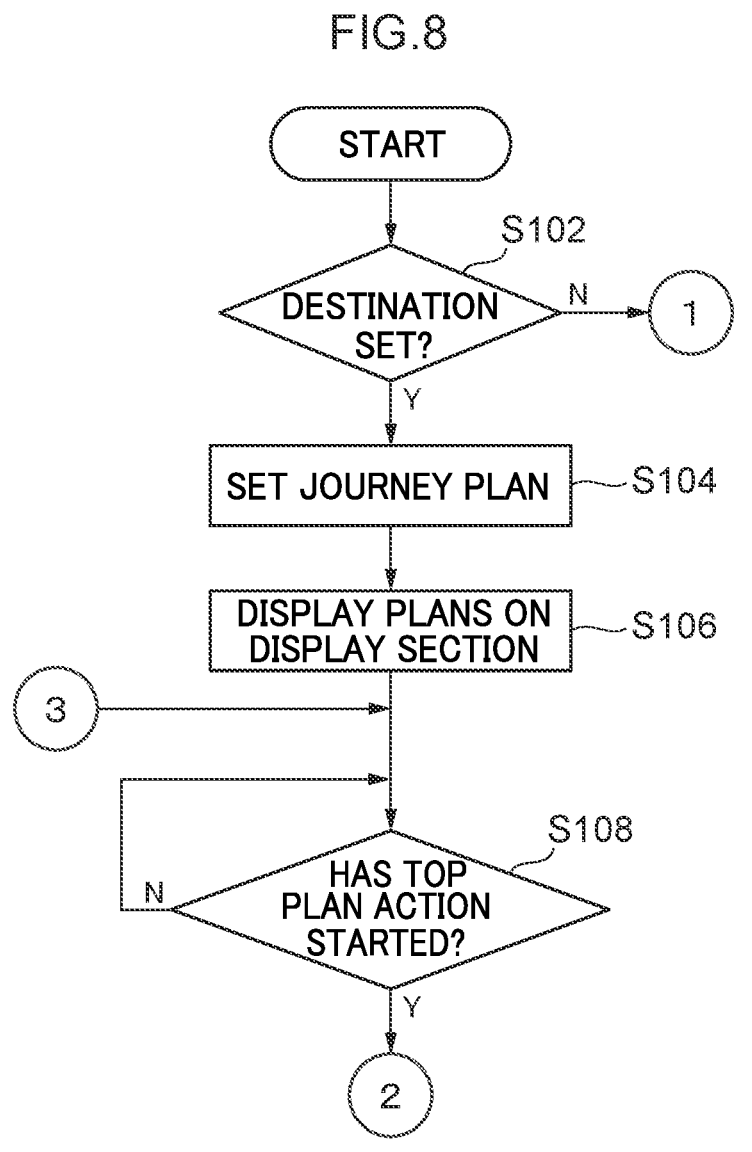

START

S102

DESTINATION
SET?                    N → 1

Y

SET JOURNEY PLAN        S104

DISPLAY PLANS ON
DISPLAY SECTION         S106

3

S108

N          HAS TOP
PLAN ACTION
STARTED?

Figure 12:
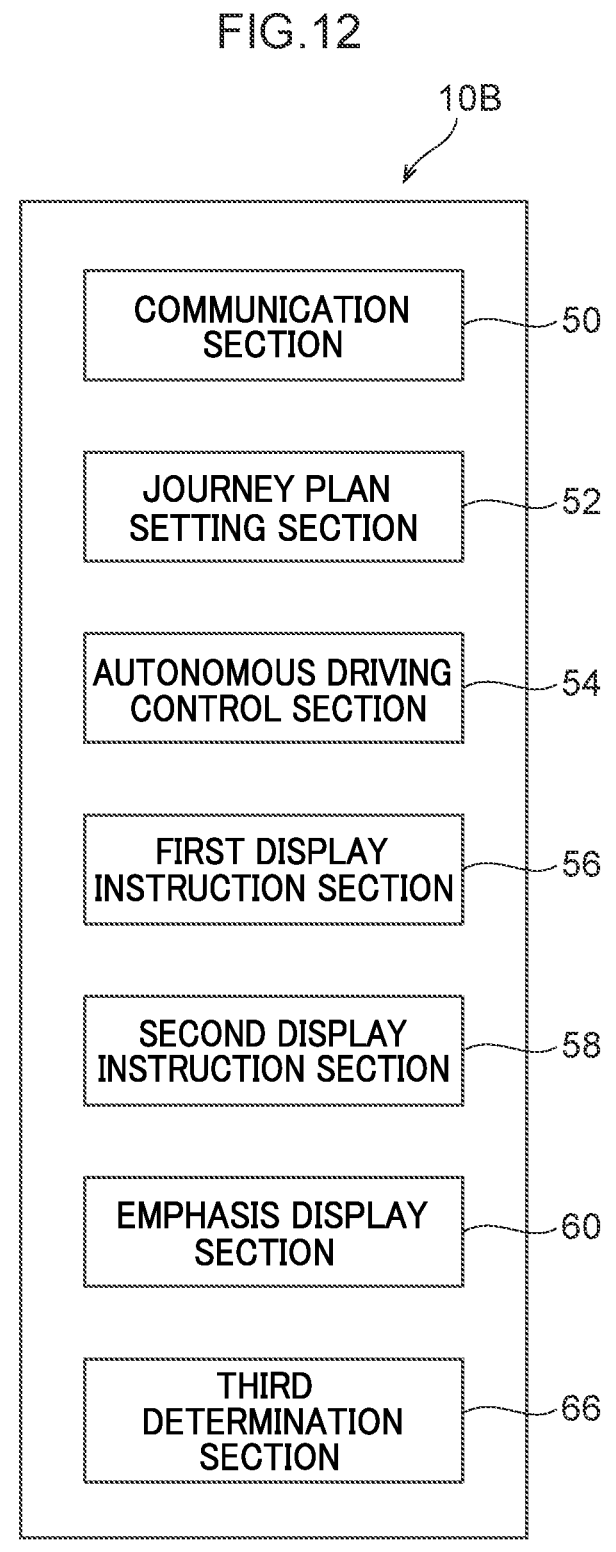

COMMUNICATION
SECTION — 50

JOURNEY PLAN
SETTING SECTION — 52

AUTONOMOUS DRIVING
CONTROL SECTION — 54

FIRST DISPLAY
INSTRUCTION SECTION — 56

SECOND DISPLAY
INSTRUCTION SECTION — 58

EMPHASIS DISPLAY
SECTION — 60

THIRD
DETERMINATION
SECTION — 66

Figure 16:
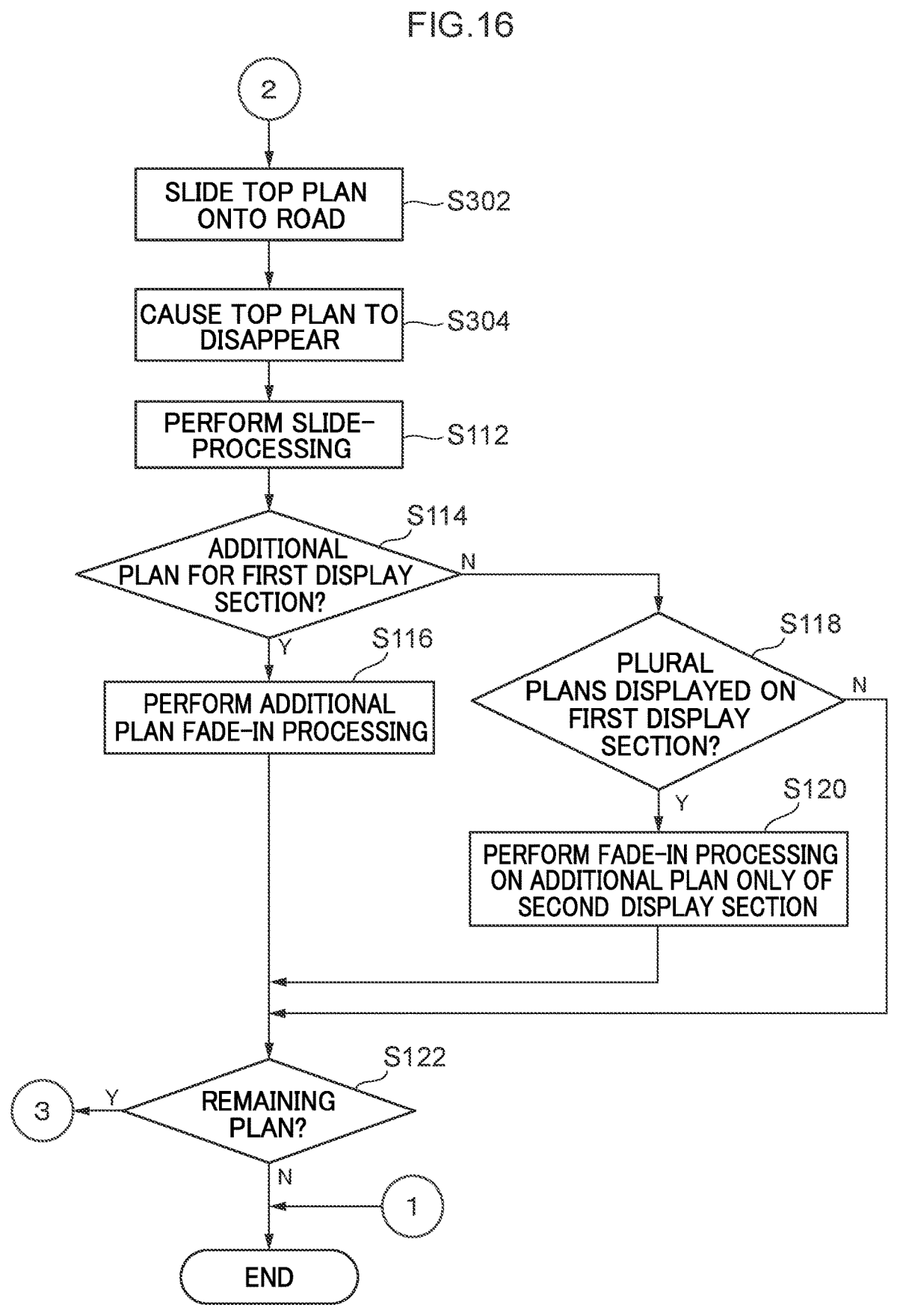

SLIDE TOP PLAN
ONTO ROAD — S302

CAUSE TOP PLAN TO
DISAPPEAR — S304

PERFORM SLIDE-
PROCESSING — S112

S114
ADDITIONAL
PLAN FOR FIRST DISPLAY
SECTION? — N

Y — S116

PERFORM ADDITIONAL
PLAN FADE-IN PROCESSING

S118
PLURAL
PLANS DISPLAYED ON
FIRST DISPLAY
SECTION? — N

Y — S120

PERFORM FADE-IN PROCESSING
ON ADDITIONAL PLAN ONLY OF
SECOND DISPLAY SECTION

S122
Y — REMAINING
PLAN?

(3)

N (1)

END

VEHICLE DISPLAY DEVICE, VEHICLE DISPLAY PROCESSING METHOD, AND NON-TRANSITORY STORAGE MEDIUM

CROSS-REFERENCE TO RELATED APPLICATION

This application is based on and claims priority under 35 USC 119 from Japanese Patent Application No. 2021-163602 filed on Oct. 4, 2021, the disclosure of which is incorporated by reference herein.

BACKGROUND

Technical Field

The present disclosure relates to a vehicle display device, a vehicle, a display processing method, and a non-transitory storage medium.

Related Art

For example, in a vehicle display device disclosed in Japanese Patent Application Laid-Open (JP-A) No. 2021-088222, an assist action for driving operation (vehicle lane change and vehicle lane merging, vehicle lane branching off, etc.) on a route to guide a vehicle to its destination is displayed on a display and head up display (hereafter referred to as "HUD").

Display processing is performed in this display device to display plural assist actions in layers from below to above in sequence from the nearest operation position (distance) assist action, such that the bottom assist action that has finished is caused to disappear and a new assist action is added for display at the top.

However, in the display device disclosed in JP-A No. 2021-088222 there is a concern that it might be difficult for an occupant to notice that the display has been updated in cases in which there is a succession of the same assist action (for example a vehicle lane change toward the right side). Namely, there is room for improvement from the perspective of ensuring an occupant ascertains with certainty that the display has been updated.

SUMMARY

The present disclosure provides a vehicle display device, a vehicle, a display processing method, and a program that enable an occupant to ascertain with certainty that a display has been updated.

A vehicle display device according to a first aspect includes a display section provided inside a vehicle cabin and including a display area capable of displaying an image and a control section. The control section causes plural plans scheduled for execution by a vehicle to be displayed in the display area in a row in scheduled execution sequence, and causes a top plan that is a plan having an earliest scheduled execution among the plural plans to disappear by fade-out processing in the display area when a prescribed condition related to the top plan has been satisfied.

In this vehicle display device the display section is provided in the vehicle cabin. The plural plans scheduled for execution by the vehicle are displayed in a row of scheduled execution sequence in the display area of the display section by the control section. The control section causes the top plan that is the plan with the earliest scheduled execution among the plural plans displayed in the display area of the display section to disappear by fade-out processing in the display area when the prescribed condition related to the top plan has been satisfied. This accordingly enables an occupant to clearly ascertain that the prescribed condition related to the top plan has been satisfied.

In particular, were updating to be executed by merely causing the top plan to disappear and displaying an added new plan in cases in which a plan that is the same (type) is displayed in succession in the display area, then there would be a concern that the occupant might not notice that display of the plans on the display section had been updated. However, due to the plan being caused to disappear by fade-out processing the occupant is able to ascertain with certainty that the display of the plans in the display area has been updated.

Note that "fade-out processing" encompasses image display processing to cause a plan to disappear by gradually lowering the display density of the plan while maintaining the position of the plan in the display area (without moving the plan), as well as image display processing to cause a plan to disappear after moving the plan in the display area.

A vehicle display device according to a second aspect is the vehicle display device according to the first aspect wherein when the top plan has been caused to disappear the control section moves any of the plans that were being displayed in the display area together with the top plan toward a position where the top plan was displayed in the display area.

In this vehicle display device, in cases in which the top plan has been caused to disappear in the display area of the display section where the plural plans are displayed in scheduled execution sequence, updating of the display of plans is by moving any of the plans that were being displayed in the display area together with the top plan toward a position where the top plan was displayed in the display area, and the occupant is able to clearly ascertain the next plan execution schedule.

A vehicle display device according to a third aspect is the vehicle display device according to the first or second aspect, wherein the control section adds an additional plan that is a plan different from the plural plans so as to be displayed in the display area.

In this vehicle display device, together with the top plan disappearing from the display area of the display section, the control section also displays the additional plan that is a plan different from the plural plans being displayed in the display area. Namely, together with the top plan disappearing among the plural plans being displayed in the display area, the additional plan different from the plural plans being displayed is added to the display area. The occupant is accordingly always able to ascertain a fixed number of plural plans scheduled for execution by looking at the display area of the display device.

A vehicle display device according to a fourth aspect is a vehicle display device according to any one of the first to third aspects wherein the control section displays an image of a road on which the vehicle is traveling at a position in the display area different from the plural plans, and moves the top plan onto the road image in the display area when a prescribed condition related to the top plan has been satisfied before then causing the top plan to disappear.

In this vehicle display device, when the prescribed condition of the top plan has been satisfied, the control section moves the top plan onto the road image, which is of the road the ego vehicle is traveling on and is being displayed a position different from the position of the plural plans in the display area, before then causing the top plan to disappear.

Thus due to the top plan disappearing after being moved onto the road image where the gaze of the occupant is easily focused in the display area of the display device, the occupant is able to ascertain with more certainty disappearance of the top plan (updating of the display of plans in the specific display area).

A vehicle display device according to a fifth aspect is the vehicle display device according to any one of the first to fourth aspects wherein the prescribed condition of the top plan is satisfied when an action of the top plan has started.

In this vehicle display device the control section takes the prescribed condition of the top plan as being satisfied in cases in which the action of the top plan has started in the vehicle, and causes the top plan to disappear by fade-out processing.

This accordingly enables an occupant to ascertain with certainty that the action of the top plan has started.

A vehicle display device according to a sixth aspect includes a display section provided inside a vehicle cabin and including a display area capable of displaying an image, and a control section. The control section causes plural plans scheduled for execution by a vehicle to be displayed in the display area in a row in scheduled execution sequence, and causes an additional plan that is a plan different from the plural plans to be inserted among the plural plans so as to be displayed in a row in scheduled execution sequence after first causing a last plan that is the plan having a latest scheduled execution among the plural plans to disappear by fade-out processing in the display area.

In this vehicle display device, the control section inserts the plan (additional plan) different from the plural plans among the plural plans displayed in the display area so as to be displayed in a row in scheduled execution sequence after first causing the plan (last plan) with the latest scheduled execution among the plural plans displayed in the display area to disappear from in the display area by fade-out processing. For example, even in cases in which an additional plan has been generated retrospectively, the additional plan can be inserted among the plural plans displayed in the display area, and the plural plans can be displayed in scheduled execution sequence in the display area.

"Inserted among the plural plans" encompasses being inserted at an extreme end of the plural plans displayed in the display area.

A vehicle display device according to a seventh aspect is the vehicle display device according to the third aspect or sixth aspect wherein the control section causes the additional plan to be displayed in the display area using fade-in processing when the additional plan is displayed in the display area.

In this vehicle display device, the plan (additional plan) different from the plural plans is displayed by fade-in processing in the display area of the display device as well as the top plan or the last plan disappearing from the plural plans that were being displayed up to now in the display area of the display section.

This thereby enables the occupant to clearly ascertain the additional plan and to clearly ascertain at which position the additional plan has been inserted (i.e. position thereof in the execution schedule).

Note that "fade-in processing" encompasses both image display processing to display the plan by gradually raising the display density of the plan at its display position in the display area, and also image display processing to display while moving the plan to the display position from a separate position in the display area.

A vehicle display device according to an eighth aspect is the vehicle display device of any one of the first to seventh aspects wherein the control section performs emphasis-display prior to the plan being caused to disappear from in the display area.

In this vehicle display device the control section performs emphasis-display prior to the plan (top plan or last plan) being caused to disappear from the display area of the display section.

The occupant is thereby able to ascertain disappearance of the top plan or last plan (updating of the display of plans) with more certainty.

A vehicle display device according to a ninth aspect is the vehicle display device according to any one of the first to eighth aspects wherein the display section is provided at an instrument panel at a vehicle front side of a driving seat.

In this vehicle display device, due to the display section being provided at the instrument panel at a vehicle front side of the driving seat, the occupant is able to check the plans in the scheduled execution sequence without the occupant needing to shift gaze much while driving.

A vehicle display device according to a tenth aspect is the vehicle display device according to any one of the first to eighth aspects, wherein the display section is a projection surface projected onto by a head up display device.

In this vehicle display device the display section is the projection surface projected onto by the head up display device, and the plural plans are displayed in the scheduled execution sequence on the projection surface that is positioned at an upper position in the vehicle. This thereby enables the plural plans near to scheduled execution in the vehicle to be checked without the occupant needing to shift gaze much while driving.

A vehicle according to an eleventh aspect is equipped with the vehicle display device of any one of the first to tenth aspects.

This vehicle is equipped with the vehicle display device of any one of the first to tenth aspects and so enables the plans scheduled for execution by the vehicle to be ascertained easily, and enables updating of the display of plans in the vehicle display device to be ascertained with certainty.

A display processing method according to a twelfth aspect is a display processing method to cause plural plans scheduled for execution by a vehicle to be displayed in a display area capable of displaying an image on a display section provided inside a vehicle cabin by display in a row in scheduled execution sequence. The display processing method includes a step of causing a top plan that is the plan having an earliest scheduled execution among the plural plans to disappear by fade-out processing in the display area when a prescribed condition related to the top plan has been satisfied.

This display processing method exhibits similar operation and advantageous effects to those of the first aspect.

A program according to a thirteenth aspect is a program to cause plural plans scheduled for execution by a vehicle to be displayed in a display area capable of displaying an image on a display section provided inside a vehicle cabin by display in a row in scheduled execution sequence. The program causes a computer to execute processing including a step of causing a top plan that is the plan having an earliest scheduled execution among the plural plans to disappear by fade-out processing in the display area when a prescribed condition related to the top plan has been satisfied.

By execution by a computer this program exhibits similar operation and advantageous effects to those of the first aspect.

As described above, the vehicle display device according to the first, second, fifth, seventh, and eighth aspects enables an occupant to ascertain with certainty that the display of plans has been updated.

The vehicle display device according to the third aspect and the sixth aspect results in a fixed number of plural plans always being displayed on the display section.

The vehicle display device according to the fourth aspect enables the occupant to ascertain with certainty the plan (driver assist control) being executed.

The vehicle display device according to the ninth and tenth aspects enables the occupant to check the plans being displayed in a row in scheduled execution sequence without the occupant needing to shift gaze much while driving.

The vehicle according to the eleventh aspect enables the occupant to ascertain with certainty that the display of plans has been updated.

The display processing method according to the twelfth aspect enables the occupant to ascertain with certainty that the display of plans has been updated.

The program according to the thirteenth aspect enables the occupant to ascertain with certainty that the display of plans has been updated.

BRIEF DESCRIPTION OF THE DRAWINGS

Exemplary embodiments of the present invention will be described in detail based on the following figures, wherein:

FIG. 1 is a schematic diagram of a front section inside a vehicle cabin of a vehicle applied with a vehicle display device according to an exemplary embodiment, as viewed from a vehicle rearward side;

FIG. 4B is a diagram illustrating a display example of a first display section;

FIG. 5B is a diagram illustrating a display example during fade-out processing on the first display section in a state 100 m onwards from the state of FIG. 4B;

FIG. 6B is a diagram illustrating a display example during fade-in processing on the first display section in a state 100 m onwards from the state of FIG. 4B;

FIG. 7B is a diagram illustrating a display example after updating processing has been performed on the first display section in a state 100 m onwards from the state of FIG. 4B;

FIG. 8 is a flowchart illustrating an example of a flow of display processing in a first exemplary embodiment;

FIG. 12 is a block diagram illustrating a functional configuration of a vehicle display device according to the second variation of the first exemplary embodiment;

FIG. 13A is a diagram illustrating a display example on the second display section during fade-out processing in the state of FIG. 4A;

FIG. 14A is a diagram illustrating a display example on the second display section during fade-in processing in the state of FIG. 4A;

FIG. 15A is a diagram illustrating a display example after updating processing has been performed on the second display section in the state of FIG. 4A;

FIG. 15B is a diagram illustrating a display example after updating processing has been performed on the first display section in the state of FIG. 4B;

FIG. 16 is a flowchart illustrating an example of a flow of display processing in a second exemplary embodiment;

FIG. 18B is an explanatory diagram regarding fade-out processing according to another example;

FIG. 19B is an explanatory diagram regarding fade-in processing according to another example.

DETAILED DESCRIPTION

First Exemplary Embodiment

Figure 1:
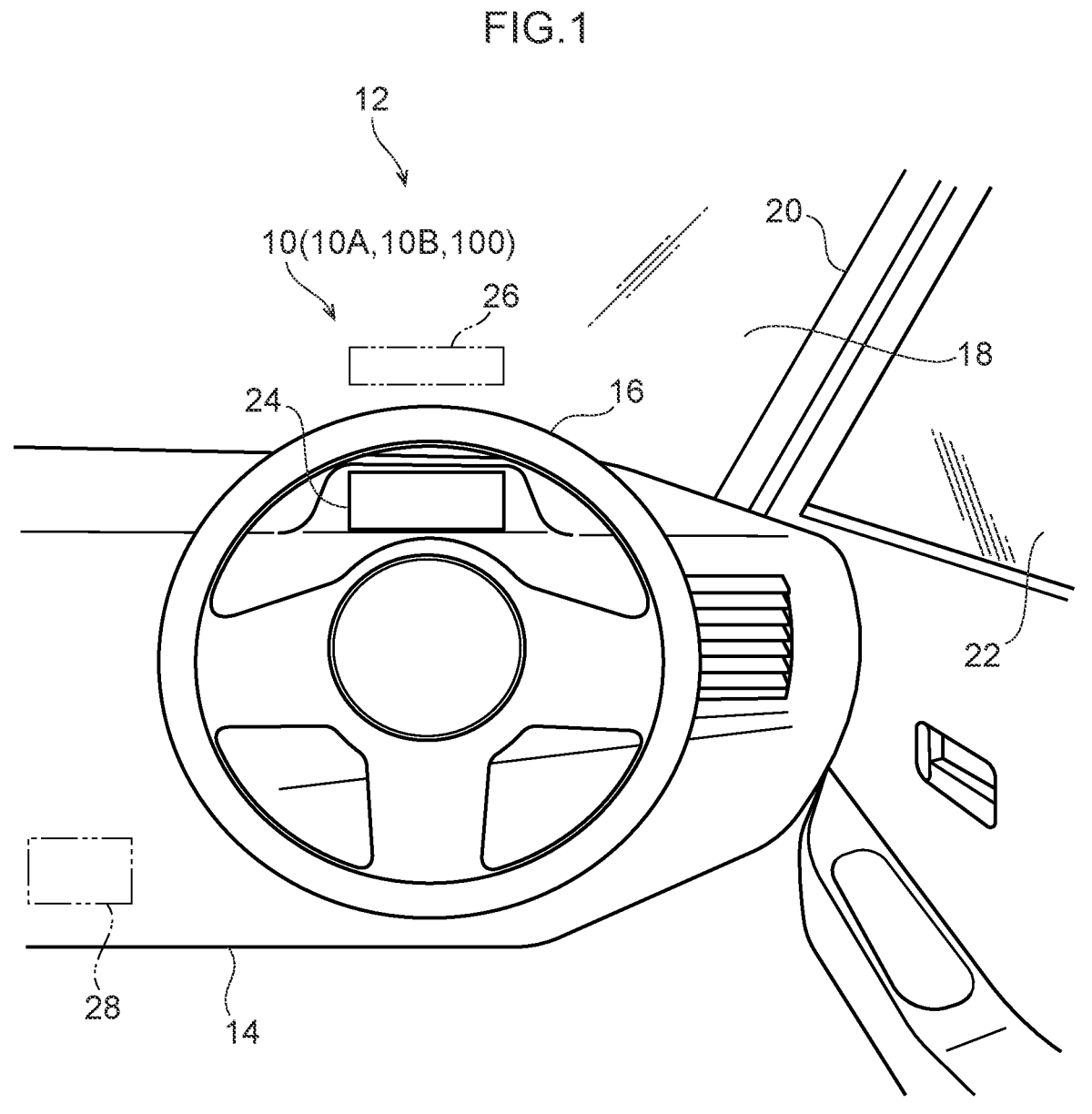
Figure 2:
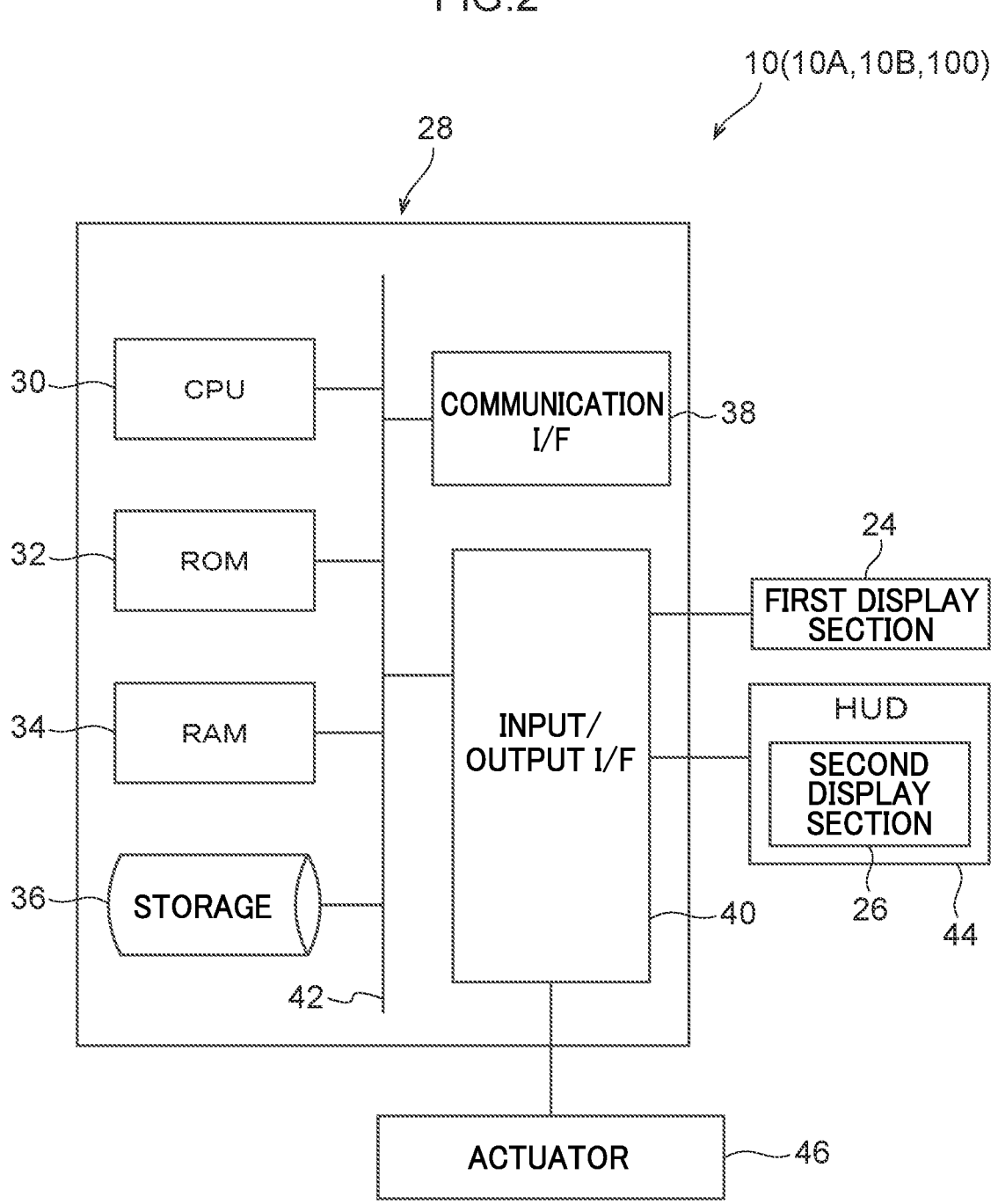
FIG. 2 is a block diagram illustrating a hardware configuration of a vehicle display device according to an exemplary embodiment.

Explanation follows regarding a vehicle 12 applied with a vehicle display device 10 according to a first exemplary embodiment, with reference to the drawings. Note that the vehicle 12 of the present exemplary embodiment is for example configured so as to be capable of switching between autonomous driving and manual driving. As illustrated in FIG. 1, an instrument panel 14 is provided at a front section of the inside of a cabin of the vehicle 12.

The instrument panel 14 extends along a vehicle width direction. A steering wheel 16 is provided on a vehicle right side of the instrument panel 14. Namely, in the present exemplary embodiment the vehicle is, as an example, a right-hand drive vehicle in which the steering wheel 16 is provided on the right side and a driving seat is installed on the vehicle right side.

Windshield glass 18 is provided at a front end portion of the instrument panel 14. The windshield glass 18 extends along a vehicle vertical direction and the vehicle width direction so as to partition the cabin interior from the cabin exterior.

A vehicle right side end portion of the windshield glass 18 is fixed to a front pillar 20 on the right side of the vehicle. The front pillar 20 extends along the vehicle vertical direction, and the windshield glass 18 is fixed to a vehicle width direction inner end portion of the front pillar 20. A front end portion of front side glass 22 is fixed to a vehicle width direction outer end portion of the front pillar 20. Note that a vehicle left side end portion of the windshield glass 18 is fixed to a non-illustrated front pillar on the left side of the vehicle.

A first display section 24 is provided at the instrument panel 14. The first display section 24 is provided at the instrument panel 14 so as to be located at the vehicle front side of the driving seat, and is provided at a position that falls within the field of view of a driver in a state in which the driver is directing their gaze toward the vehicle front side.

A second display section 26 is provided on the windshield glass 18. The second display section 26 is set at the vehicle upper side of the first display section 24, and is configured by a head up display device 44 (see FIG. 2) that projects onto a projection surface. More specifically, the head up display device 44 is provided further toward the vehicle front side than the instrument panel 14, in a configuration in which an image from the head up display device 44 is projected onto the second display section 26 of the windshield glass 18.

Hardware Configuration of Vehicle Display Device 10

An electronic control unit (ECU) 28, serving as a control section, is provided at the vehicle 12. FIG. 2 is a block diagram illustrating a hardware configuration of the vehicle display device 10. As illustrated in FIG. 2, the ECU 28 of the vehicle display device 10 is configured including a central processing unit (CPU) 30, read only memory (ROM) 32, random access memory (RAM) 34, storage 36, a communication interface 38, and an input/output interface 40. The respective configurations are connected together so as to be capable of communicating with each other through a bus 42.

The CPU 30 is a central processing unit that executes various programs and controls each configuration section. Namely, the CPU 30 reads a program from the ROM 32 serving as a memory or the storage 36 serving as a memory, and executes the program using the RAM 34 as a workspace. The CPU 30 controls the above-mentioned configurations and performs various computation processing according to the program stored in the ROM 32 or the storage 36.

The ROM 32 stores various programs and various data. The RAM 34 acts as a workspace to temporarily store programs and data. The storage 36 is configured by a hard disk drive (HDD) or a solid state drive (SSD), and stores various programs including an operating system, as well as various data. In the present exemplary embodiment, a program, various data, and the like for performing display processing are stored in the ROM 32 or the storage 36.

The communication interface 38 is an interface enabling the vehicle display device 10 to communicate with a non-illustrated server and other equipment, and employs a standard such as Ethernet (registered trademark), LTE, FDDI, or Wi-Fi (registered trademark).

The first display section 24, the head up display device 44 that projects images onto the second display section 26, and actuators 46 are connected to the input/output interface 40. The actuators 46 are configured including a steering actuator, an accelerator actuator, and a brake actuator. The steering actuator performs steering of the vehicle 12. The accelerator actuator performs acceleration of the vehicle 12. The brake actuator controls the brakes to perform deceleration of the vehicle 12. Note that various non-illustrated sensors, a GPS device, and the like employed during autonomous travel of the vehicle 12 are also connected to the input/output interface 40.

Functional Configuration of Vehicle Display Device 10

The vehicle display device 10 implements various functions using the above-described hardware resources. Explanation follows regarding functional configurations implemented by the vehicle display device 10, with reference to FIG. 3.

Figure 3:
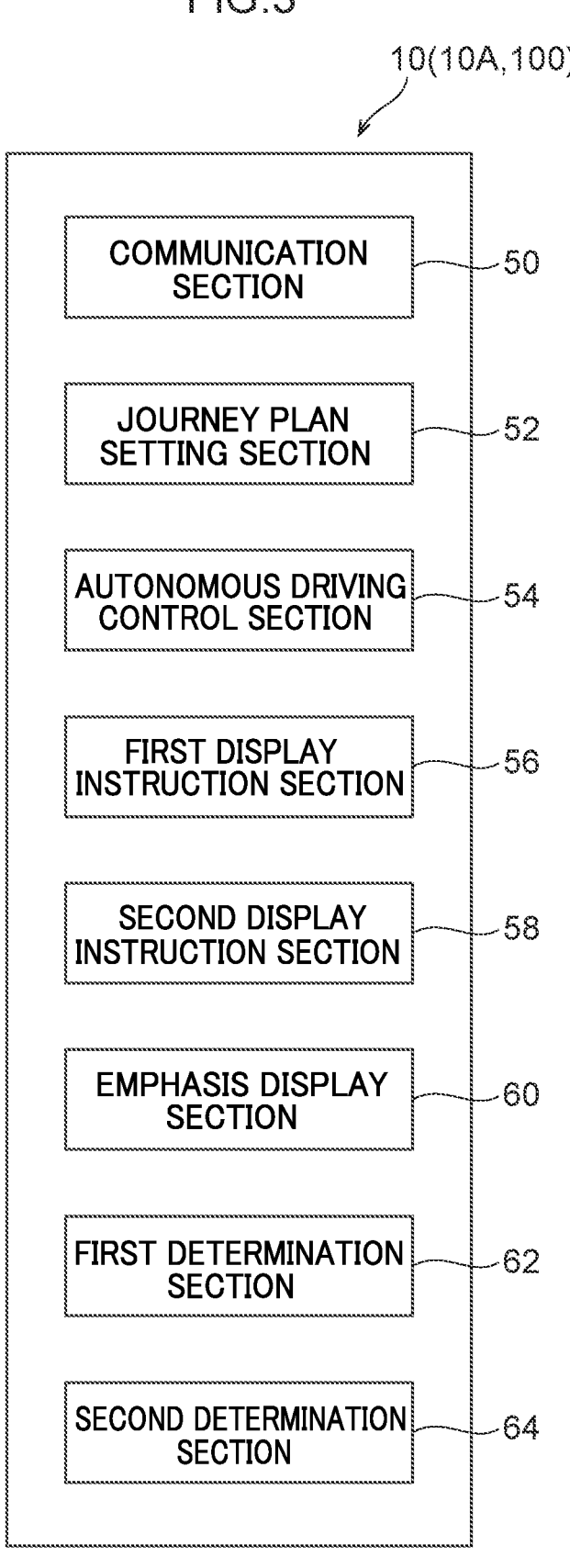
FIG. 3 is a block diagram illustrating a functional configuration of a vehicle display device according to an exemplary embodiment.

As illustrated in FIG. 3, the vehicle display device 10 is configured including, as functional configuration, a communication section 50, a journey plan setting section 52, an autonomous driving control section 54, a first display instruction section 56, a second display instruction section 58, an emphasis display section 60, a first determination section 62, and a second determination section 64. The respective functional configurations are implemented by the CPU 30 reading and executing a program stored in the ROM 32 or the storage 36.

The communication section 50 exchanges data with an external server and other equipment through the communication interface 38. Examples of the data exchanged include map data and traffic conditions that are stored on the server. The communication section 50 may be configured to perform vehicle-to-vehicle communication with vehicles in the surroundings.

The journey plan setting section 52 sets a journey plan for the vehicle 12. More specifically, when an occupant inputs a destination, the journey plan setting section 52 sets a journey plan from the current location to the destination.

The autonomous driving control section 54 causes the vehicle 12 to travel autonomously according to the set journey plan while taking into consideration position information and environmental information regarding the surroundings of the vehicle 12. More specifically, the autonomous driving control section 54 controls the actuators 46 so as to cause the vehicle 12 to travel autonomously.

The first display instruction section 56 displays plans of the vehicle 12 on the first display section 24 based on the journey plan set by the journey plan setting section 52. Explanation follows regarding the functionality of the first display instruction section 56, with reference to FIG. 4B, FIG. 5B, and FIG. 6B.

As illustrated in FIG. 4B, a set speed VA under cruise control and a current speed VB of the vehicle 12 are displayed in an upper part of a display area 24A of the first display section 24. The set speed VA and the vehicle speed VB are displayed at a vehicle width direction left side of the display area 24A of the first display section 24. The set speed VA is displayed in a smaller font and in a lower row, and is set to 120 km/h as an example. The current vehicle speed VB is displayed in an upper row, and is displayed as 58 km/h. The vehicle 12 is thereby set to travel at a speed of up to 120 km/h while maintaining a constant inter-vehicle distance from a vehicle in front.

An image V1 representing the ego vehicle, and an image V2 and an image V3 representing peripheral vehicles, are displayed at the left side of the display area 24A of the first display section 24 on a road image R. It can be ascertained from looking at the image V1 that the ego vehicle is traveling in the centermost lane out of three traffic lanes of the road image R. The image V2 and the image V3 are both displayed based on information detected by various non-illustrated sensors mounted to the vehicle 12. It can be ascertained from looking at the image V2 and the image V3 that the respective vehicles are traveling at the oblique front-right of the ego vehicle, and in front of the ego vehicle. Note that the position of the ego vehicle may be detected by the GPS device installed in the vehicle 12. A combination of sensors, such as a stereo camera, an ultrasound sensor, millimeter-wave radar, and laser radar, are employed as the sensors to detect peripheral vehicles. Alternatively, a configuration may be adopted in which the position of the ego vehicle and the positions of vehicles in the surroundings may be ascertained by vehicle-to-vehicle communication with the vehicles in the surroundings.

A specific display area 24B where plans of the vehicle 12 are displayed by the first display instruction section 56 is set at a right side of the display area 24A of the first display section 24, and plural plans for scheduled execution are displayed in the specific display area 24B. In the present exemplary embodiment, as an example, there are three plans displayed, these being a first plan P1, a second plan P2, and a third plan P3, in a bottom-up sequence. Three items of information are displayed for each of plans, these being a distance from the current position to a scheduled execution position of the action, a scheduled travel path, and a driving category. The driving category refers to a category such as whether the action is to be manually performed by the driver, or the action is to be performed by autonomous driving. In the present exemplary embodiment as an example, setting is made such that only three imminent plans are displayed, and subsequent plans thereto are not displayed. However, there is no limitation thereto. For example, four or more plans may be displayed on the first display section 24. Alternatively, the number of plans (this being a plural number) displayed on the first display section 24 may be freely set.

Specific explanation follows regarding the first plan P1, the second plan P2, and the third plan P3.

As illustrated in FIG. 4B, "100 m" is displayed at the left of the first plan P1, with this indicating an action is to be executed at approximately 100 m ahead of the current position. Moreover, a graphic representation of a change of vehicle lane from the left vehicle lane to the right vehicle lane is displayed at the center of the first plan P1, enabling a scheduled travel path to be ascertained from the graphic representation. Moreover, "ASSIST" is displayed at the right side of the first plan P1, indicating this to be an action performed (executed) by autonomous driving (driver assist control).

Note that the first plan P1 is displayed slightly enlarged compared to second plan P2 and the third plan P3, described later. The first plan P1 corresponds to the "top plan".

The second plan P2 is displayed above the first plan P1. "200 m" is displayed at the left of the second plan P2 to indicate that this action will be performed (executed) approximately 200 m ahead of the current position. A graphic representation of a path to merge from a left side road into the main traffic stream is displayed at the center of the second plan P2, enabling the scheduled travel path to be ascertained from the graphic representation. "MANUAL" is displayed at the right side of the second plan P2 to indicate that this action will be performed by manual driving. Namely, a temporary handover from autonomous driving to manual driving will be performed prior to traveling 200 m. Note that as an example in the present exemplary embodiment the occupant only performs a merging action, in a configuration in which there is a switch over to autonomous driving after the vehicle lane change.

The third plan P3 is displayed above the second plan P2. "800 m" is displayed at the left of the third plan P3 to indicate that this action will be performed (executed) approximately 800 m ahead of the current position. A graphic representation of a vehicle lane change from a left vehicle lane to a right vehicle lane is displayed at the center of the third plan P3, enabling the scheduled travel path to be ascertained from the graphic representation. "ASSIST" is displayed at the right side of the third plan P3 to indicate that this action will be performed by autonomous driving (driver assist control).

Examples of cases in which a plan by manual driving is inserted into a journey plan for autonomous driving include, for example, cases in which a spot is ascertained in advance to be always busy and merging under autonomous driving would be difficult, cases in which vehicle lane change is anticipated to be difficult under autonomous driving due to the occurrence of a traffic jam due to an accident or the like, etc.

FIG. 5B illustrates an image displayed on the first display section 24 in a state in which the vehicle 12 has traveled approximately 100 m from the state in FIG. 4B. As illustrated in FIG. 5B, the display at the left of the first plan P1 has changed to "0 m", and the display at the left of the second plan P2 has changed to "100 m". The display at the left of the third plan P3 has changed to "700 m".

Moreover, FIG. 5B is a diagram illustrating a state during fade-out processing (image display processing in which display density is gradually lowered) as an example of animation processing of the first plan P1 illustrated in FIG. 4B.

Namely, in FIG. 5B the first plan P1 in the specific display area 24B of the display area 24A is in a state of lowered display density from the state of FIG. 4B (this state is illustrated by a dashed-line box illustrating the first plan P1). The other display content is similar to that of FIG. 4B.

FIG. 6B is a diagram illustrating a state after the fade-out processing of the first plan P1 illustrated in FIG. 5B has ended (the first plan P1 has disappeared), in which the second plan P2 and the third plan P3 are each displayed in the specific display area 24B slid (moved) one row lower, and a fourth plan P4 is illustrated at a position on the third row in a state during fade-in processing (image display processing in which the display density is gradually raised).

Namely, FIG. 6B illustrates a process (intermediate state) of gradually raising the display density of the fourth plan P4 at a third row position in the specific display area 24B (this state is illustrated by a dashed-line box illustrating the fourth plan P4).

As illustrated in FIG. 6B, "1.5 km" is displayed at the left of the fourth plan P4, so as to indicate that this action will be performed approximately 1.5 km ahead of the current position. Moreover, a path merging from a right side road into the main traffic stream is displayed by a graphic representation at the center of the fourth plan P4, thereby enabling a scheduled travel path to be ascertained from the graphic representation. Furthermore, "ASSIST" is displayed at the right side of the fourth plan P4, indicating that the action is to be performed by autonomous driving (driver assist control).

FIG. 7B is a diagram illustrating a state in which the fade-in processing has been completed for the fourth plan P4.

As illustrated in FIG. 7B, in the specific display area 24B of the display area 24A, the display density of the fourth plan P4 has been raised to the display density of other plans (second plan P2, third plan P3), and the fourth plan P4 is displayed in the specific display area 24B above the third plan P3. The other display content is similar to that of FIG. 6B.

Next, description follows regarding the second display instruction section 58.

As illustrated in FIG. 3, the vehicle display device 10 is equipped with the second display instruction section 58 as functional configuration. The second display instruction section 58 is configuration to cause two plans having the earliest scheduled execution to be displayed on the second display section 26, among the plans being displayed on the first display section 24 by the first display instruction section 56.

The emphasis display section 60 includes functionality to cause the plan with the earliest scheduled execution (hereafter referred to as the "top plan") to be emphasis-displayed (enlargement-displayed) compared to other plans when plural plans are respectively displayed in the specific display areas 24B, 26B of the first display section 24 and the second display section 26.

By this functionality of the emphasis display section 60, the first plan P1 that is the top plan (see FIG. 4B) and the second plan P2 (see FIG. 7B) are displayed in the specific display area 24B of the first display section 24 slightly enlarged compared to other plans, as illustrated in FIG. 4B. For example, enlarged by a factor of 110%.

Moreover, when plural plans are displayed in the second display section 26 the emphasis display section 60 displays the most imminent plan on the second display section 26 emphasized more than other plans.

Explanation follows regarding the functionality of the second display instruction section 58 and the emphasis display section 60, with reference to FIG. 4A to FIG. 7A. Note that the images displayed in the second display section 26 are substantially the same as the images displayed in the first display section 24, and so the same reference numerals will be appended thereto and detailed explanation thereof will be omitted. Note that for images displayed in the second display section 26, images that are substantially the same those of the first display section 24 are displayed with content synchronized to the display of the first display section 24.

Figure 4A:
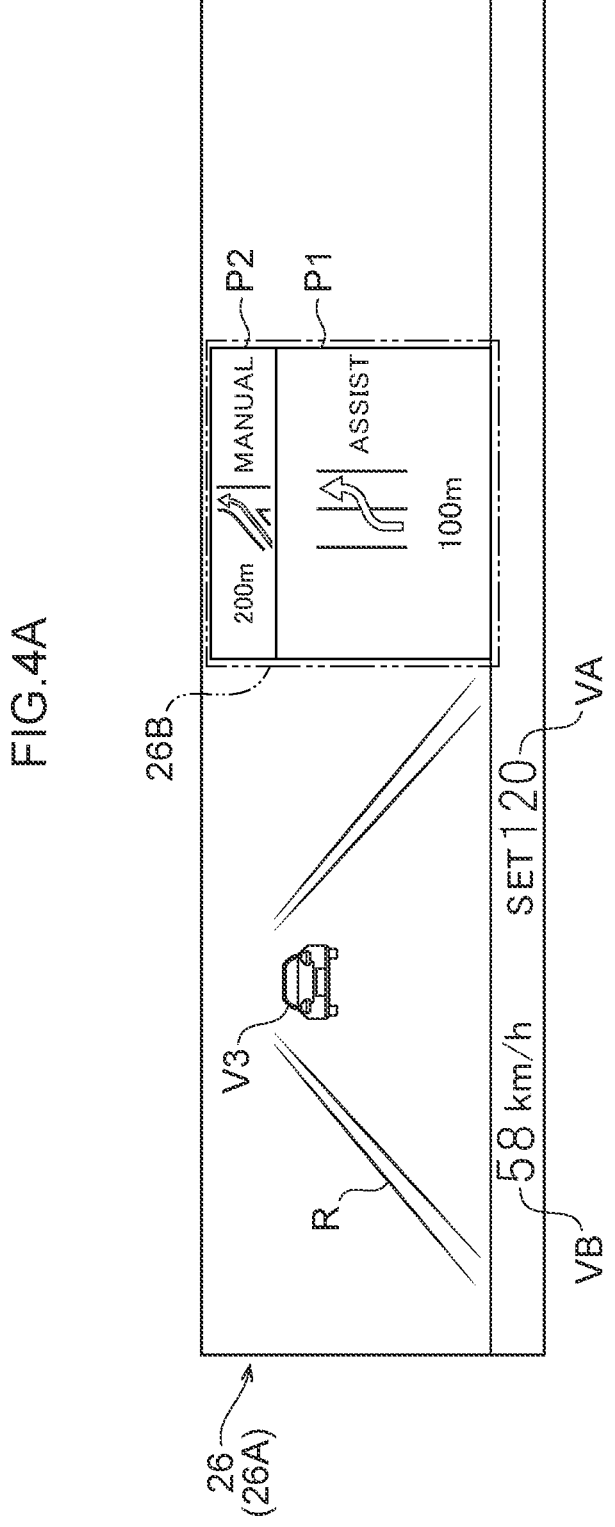
FIG. 4A is a diagram illustrating a display example of a second display section.
Figure 4B:
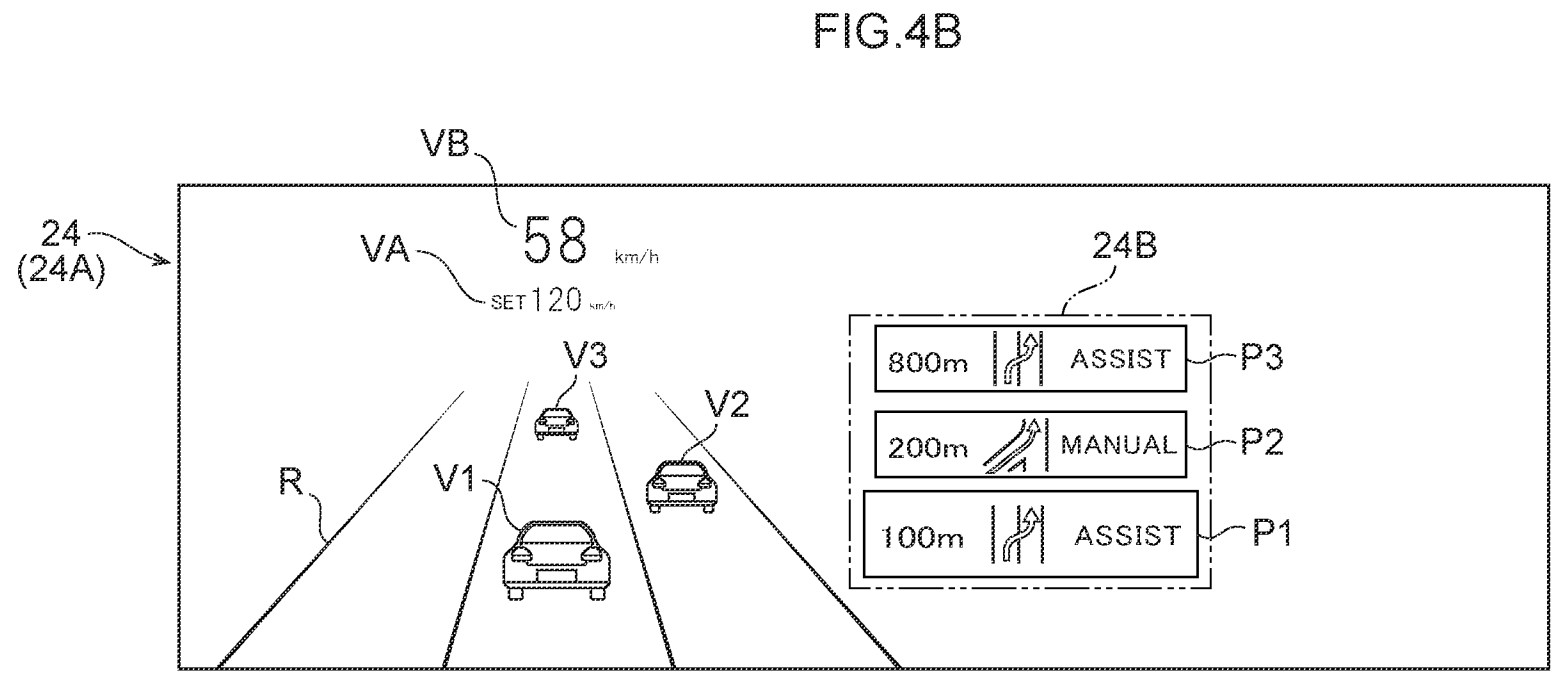

As illustrated in FIG. 4A, the set speed VA under cruise control and the current vehicle speed VB of the vehicle 12 are displayed at a lower portion of a display area 26A of the second display section 26. The set speed VA and the vehicle speed VB are displayed at a vehicle width direction left side of the display area 26A of the second display section 26. The set speed VA displayed at the right side is set, for example, to a speed of 120 km/h. The current vehicle speed displayed at the left side is displayed as a speed of 58 km/h. Thus the vehicle 12 is set to travel at a speed of up to 120 km/h while maintaining a constant inter-vehicle distance from a vehicle in front. Note that display of the set speed and the vehicle speed is synchronized to the content of the first display section 24.

A specific display area 26B on which plans of the vehicle 12 are displayed by the second display instruction section 58 is set at the right side of the display area 26A of the second display section 26, and plural plans scheduled for execution (the most imminent first plan P1 and the second plan P2 next scheduled for execution) are displayed in the specific display area 26B. The first plan P1 that is the most imminent plan is displayed below. The first plan P1 is, as illustrated in FIG. 4A, displayed enlarged compared to other plans (the second plan P2), with a distance of 100 m to the first plan P1 noted below. A graphic representation a vehicle lane change from the left vehicle lane to the right vehicle lane is illustrated above the distance of 100 m, and "ASSIST" to indicate autonomous driving is displayed at the right side of the graphic representation.

Moreover, the second plan P2 is displayed above the first plan P1 in the display area 26A of the second display section 26.

Figure 5A:
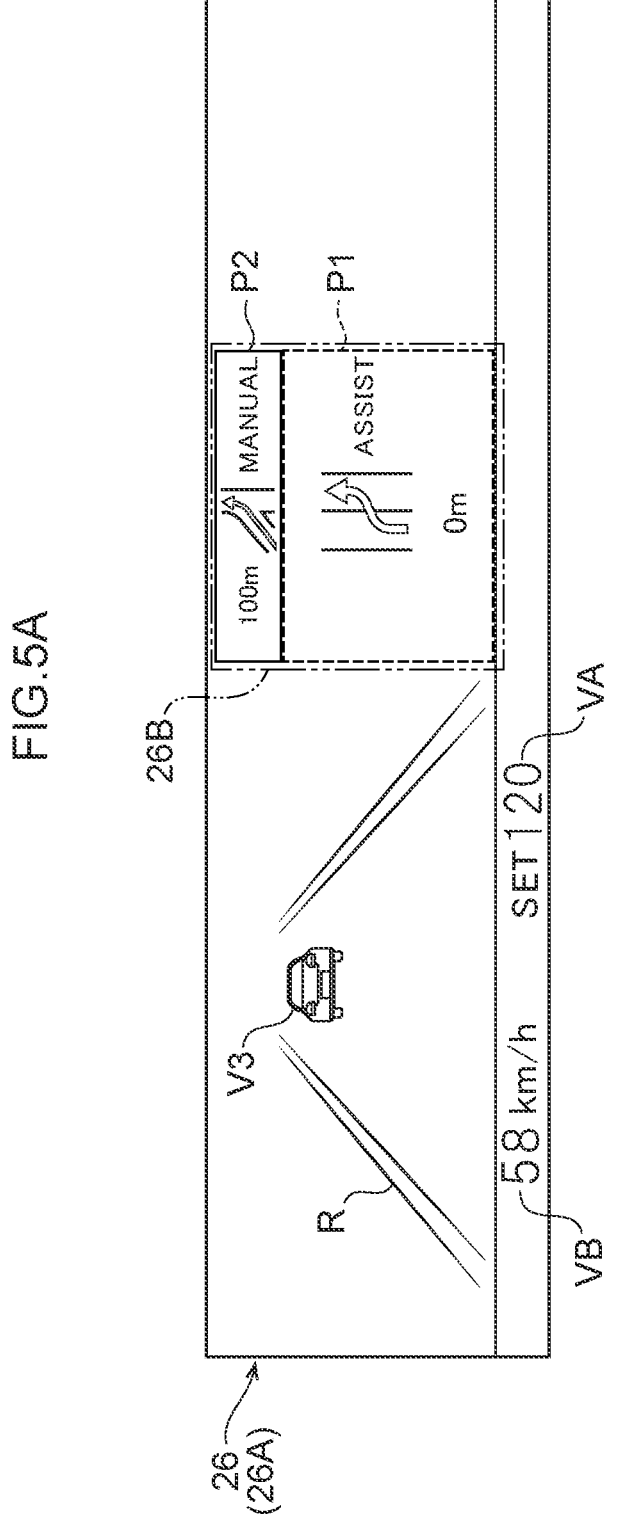
FIG. 5A is a diagram illustrating a display example during fade-out processing on the second display section in a state 100 m onwards from the state of FIG. 4A.
Figure 5B:
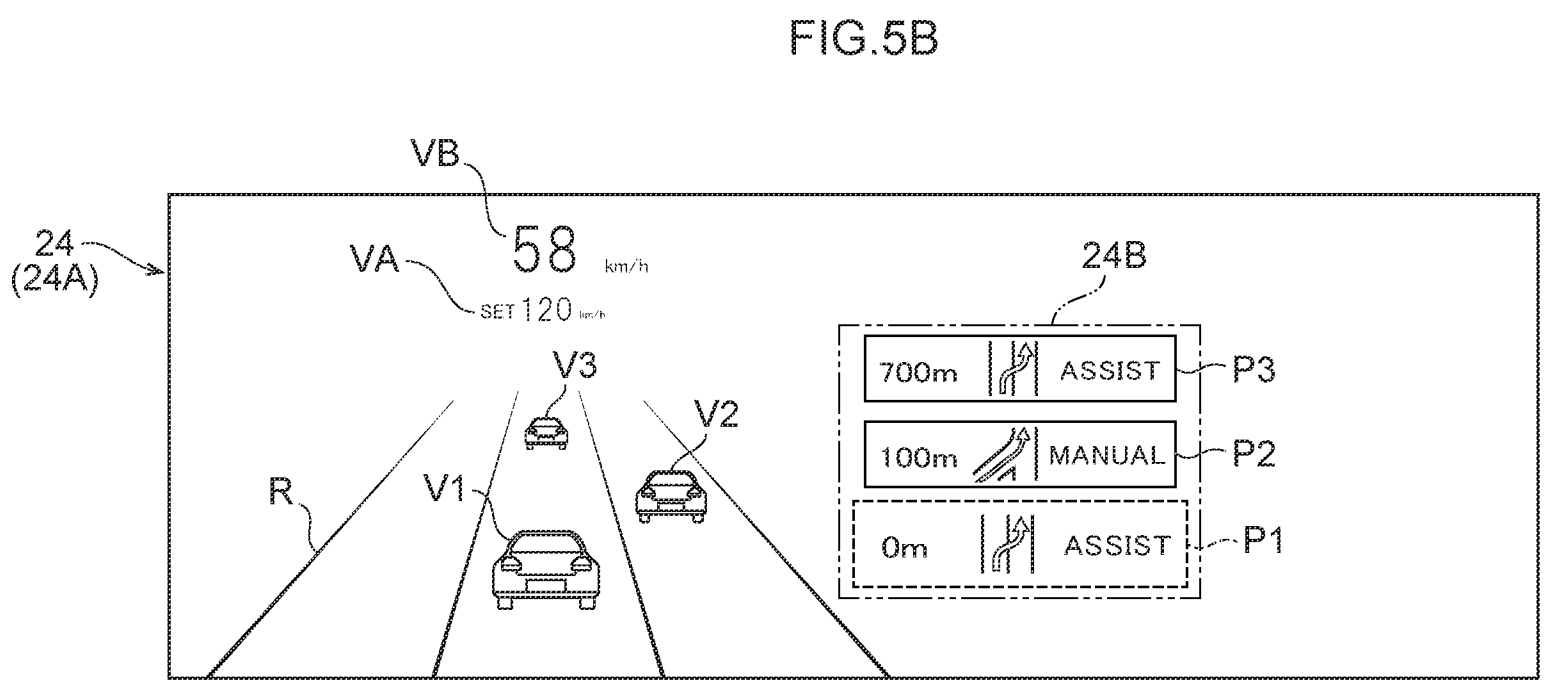

FIG. 5A is a diagram illustrating a state in which the vehicle 12 is positioned 100 m ahead from the state of FIG. 4A, and is a diagram in which the first plan P1 in the specific display area 26B of the display area 26A is illustrated in a state during fade-out processing.

Figure 6A:
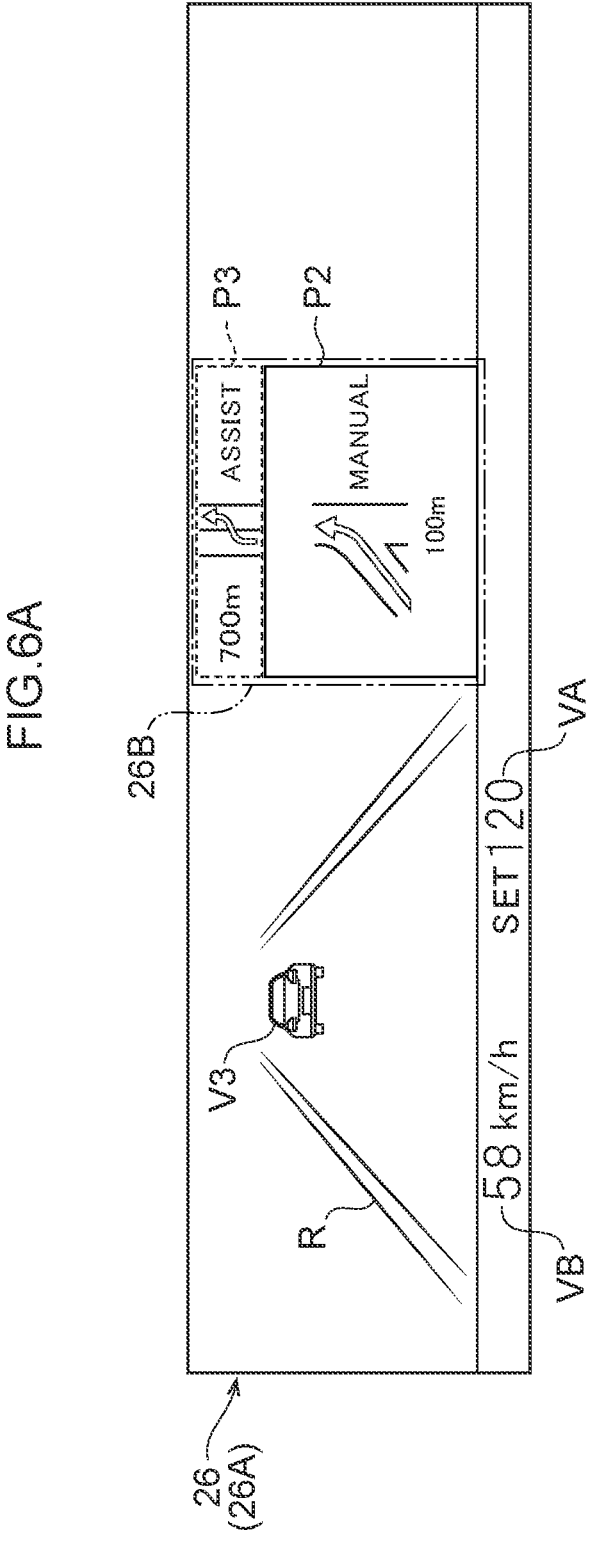
FIG. 6A is a diagram illustrating a display example during fade-in processing on the second display section in a state 100 m onwards from the state of FIG. 4A.
Figure 6B:
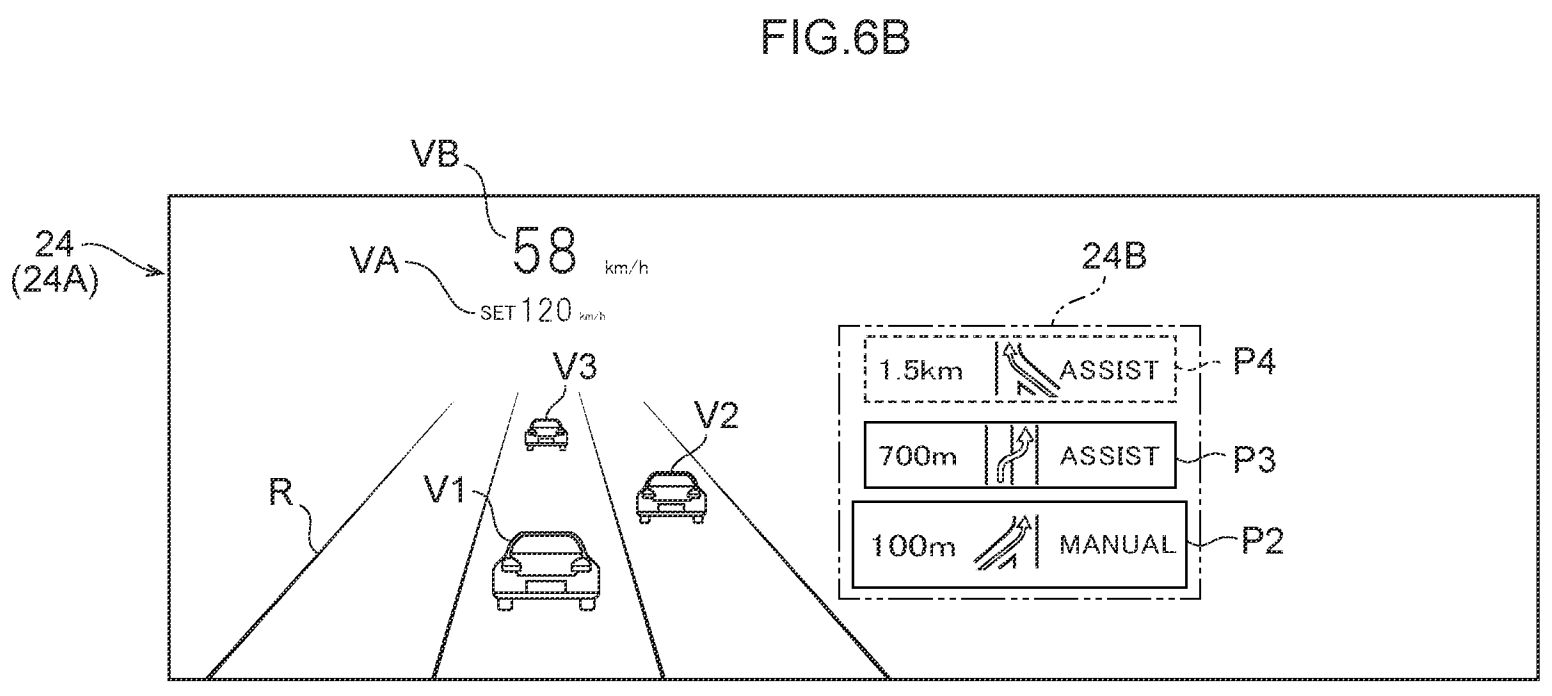

FIG. 6A is a diagram illustrating a state in which, after the first plan P1 has disappeared from the specific display area 26B of the display area 26A of the second display section 26, the second plan P2 has moved downward and is displayed enlarged, from the state of FIG. 5A. The added third plan P3 is illustrated in the specific display area 26B of the display area 26A in a state during fade-in processing.

Figure 7A:
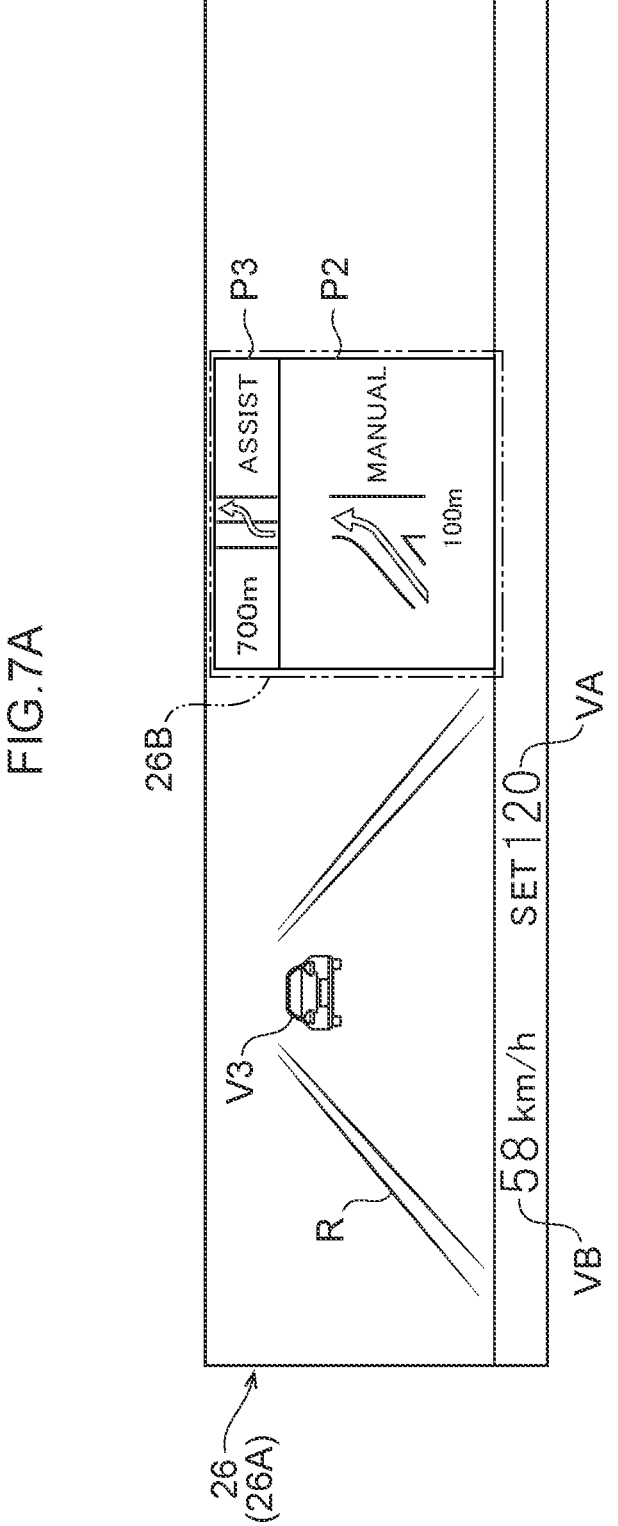
FIG. 7A is a diagram illustrating a display example after updating processing has been performed on the second display section in a state 100 m onwards from the state of FIG. 4A.
Figure 7B:
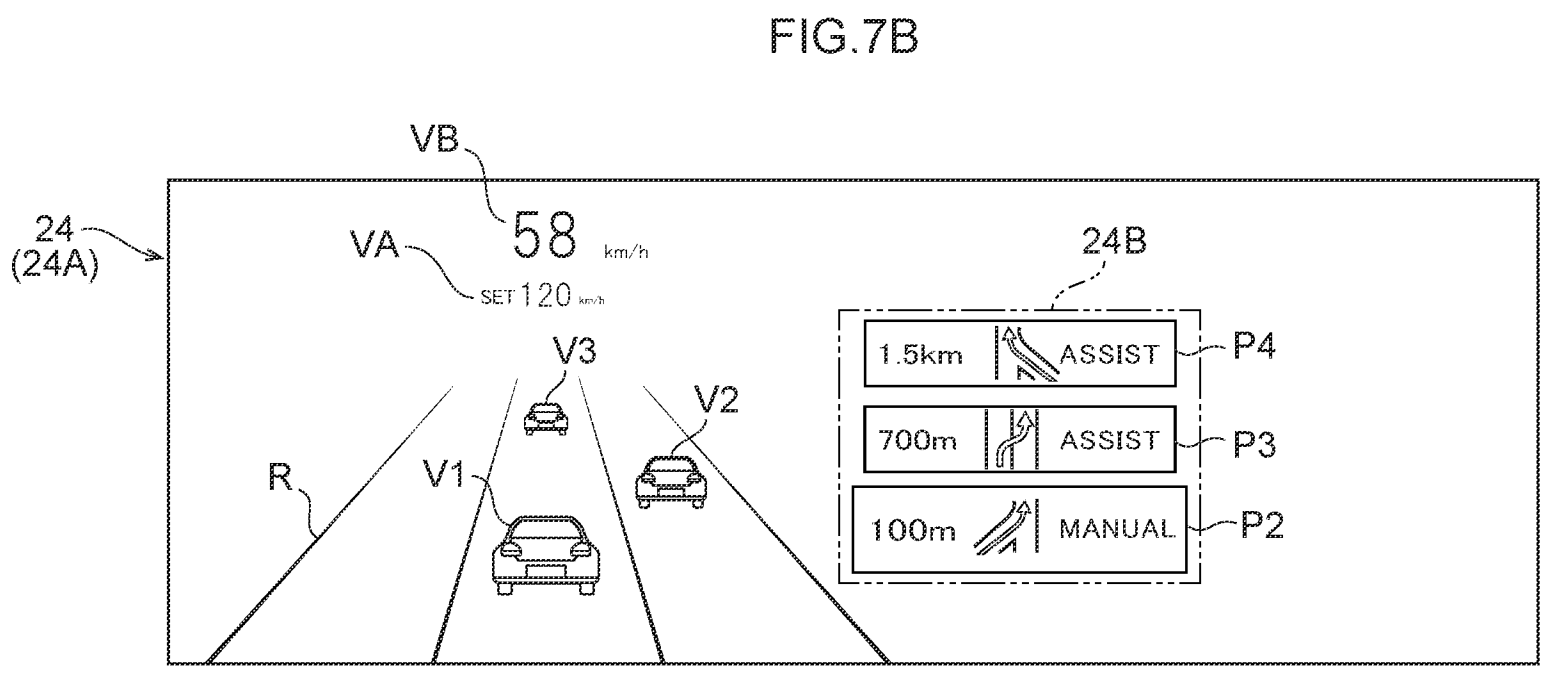

FIG. 7A is a diagram illustrating a state when the fade-in processing of the third plan P3 has been completed from the state of FIG. 6A, in a diagram in which in the specific display area 26B the third plan P3 is illustrated in a state displayed above the second plan P2.

Next, description follows regarding the functionality of the first determination section 62. As described above, the display of plans in the specific display areas 24B, 26B by the first display instruction section 56 and the second display instruction section 58 is updated, and the timing of starting such updating is a timing when the action of the top plan has started. The first determination section 62 determines whether or not the action of the top plan has started.

More specifically, for each of the types of action in the top plan (such as vehicle lane change, vehicle lane merging, vehicle lane branch off) the first determination section 62 has functionality to detect whether or not the action has started by detecting the presence/absence of a drive signal for the actuator first performing at the start of the action. For example, an action of the top plan is determined to have started by detecting a flashing drive signal for a right side direction indicator of the vehicle 12 when the top plan is to change vehicle lane toward the right vehicle lane.

Explanation now follows regarding functionality of the second determination section 64. The second determination section 64 has functionality to determine whether or not there is a plan for additional display when updating the display of plans in the specific display areas 24B, 26B.

More specifically, determination is made as to whether or not there is a plan not yet displayed in the specific display areas 24B, 26B of the first display section 24 and the second display section 26 in the journey plan (list of plans) generated by the journey plan setting section 52.

Note that in cases in which there is a different number of plans displayed in the specific display area 24B and the specific display area 26B as in the present exemplary embodiment, the second determination section 64 first makes determination for the first display section 24 (the specific display area 24B) having the greatest number of plans for display. This is because there is also an additional plan for the second display section 26 (specific display area 26B) in cases of affirmative determination (there is a plan (additional plan) not yet displayed).

However, in cases in which this determination is negative, the second determination section 64 determines whether or not there are plural plans displayed in the specific display area 24B, and determines there to be an additional plan for the second display section 26 when this determination is affirmative.

Operation

Explanation follows regarding operation of the present exemplary embodiment.

Display Processing

Figure 9:
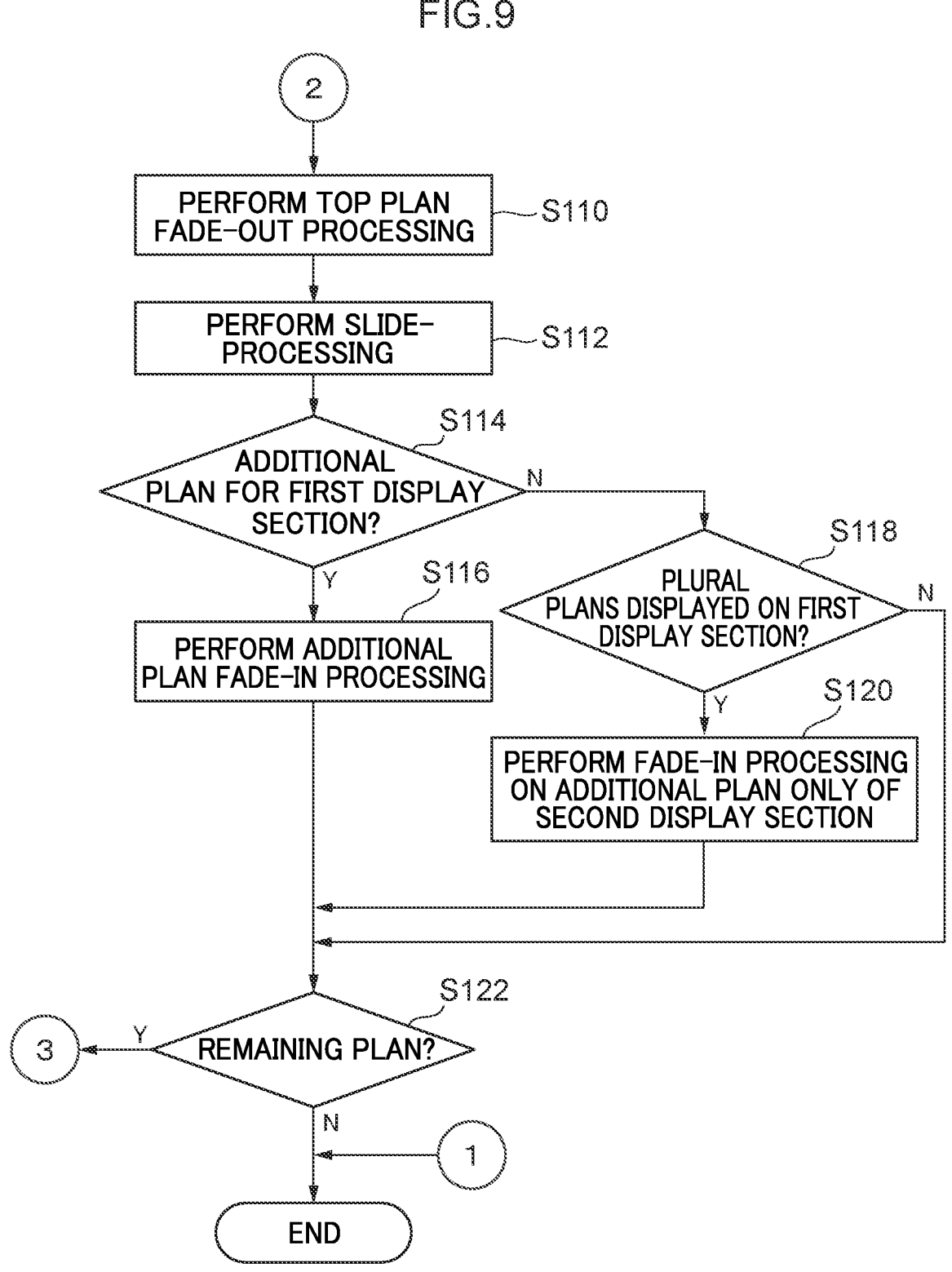
FIG. 9 is a flowchart illustrating an example of a flow of display processing in the first exemplary embodiment.

Explanation follows regarding an example of the display processing to display plans of the vehicle 12 based on a journey plan, with reference to the flowcharts illustrated in FIG. 8 and FIG. 9. The display processing is executed by the CPU 30 reading a display program from the ROM 32 or the storage 36 and expanding and executing the display program in the RAM 34.

As illustrated in FIG. 8, at step S102 the CPU 30 determines whether or not a destination has been set. The destination may be input to the vehicle 12 directly by an occupant, or may be input indirectly using a portable terminal or the like.

In cases in which the CPU 30 determines that a destination has been set at step S102, processing transitions to step S104. In cases in which the CPU 30 determines that the destination has not been set at step S102, the display processing is ended.

At step S104 the CPU 30 sets a journey plan for the vehicle 12. More specifically, the CPU 30 uses the functionality of the journey plan setting section 52 to set a journey plan from the current location to the destination. Information related to traffic conditions, accidents, and the like may be acquired and reflected when setting the journey plan. Moreover, a journey plan may be set according to pre-input wishes of the occupant, such as a wish to increase autonomous driving.

At step S106 the CPU 30 displays plans on the first display section 24 and the second display section 26. More specifically, based on the journey plan the CPU 30 uses functionality of the first display instruction section 56 and the second display instruction section 58 to display the plans of the vehicle 12 on the first display section 24 and the second display section 26, respectively.

As an example, as illustrated in FIG. 4B, the CPU 30 displays three plans, i.e. the first plan P1, the second plan P2, and the third plan P3, in the specific display area 24B set at the right side of the display area 24A of the first display section 24. Similarly, as illustrated in FIG. 4A, the CPU 30 displays two plans, i.e. the first plan P1 and the second plan P2, in the specific display area 26B set at the right side of the display area 26A of the second display section 26.

When doing so the CPU 30 uses the functionality of the emphasis display section 60 to display the first plan P1 that is the top plan in the specific display area 24B of the first display section 24 by display slightly enlarged compared to display of the other plans (the second plan P2, the third plan P3), as illustrated in FIG. 4B.

Similarly, the CPU 30 uses the functionality of the emphasis display section 60 to display the first plan P1 that is the top plan in the specific display area 26B of the second display section 26 by displaying slightly enlarged compared to display of the other plan (the second plan P2), as illustrated in FIG. 4A.

At step S108 the CPU 30 uses the functionality of the first determination section 62 to determine whether or not the action of the top plan (the first plan P1) has started. The determination as to whether or not the action (vehicle lane change control (driver assist control)) has started of the first plan P1, which is the top plan among the plans P1 to P3 displayed in the first display section 24 as illustrated in FIG.

4B, is determination performed from drive signals to the actuators 46 and the like. For example, for vehicle lane change, determination is made as to whether or not vehicle lane change control (driver assist control) of the first plan P1 has started by using the first determination section 62 to detect for a flashing drive signal of a direction indicator.

Note that the CPU 30 is on standby for affirmative determination in cases in which negative determination has been made at step S108.

When affirmative determination was made at step S108, at step S110 the CPU 30 uses the functionality of the first display instruction section 56 and the second display instruction section 58 to, as illustrated in FIG. 9, perform the fade-out processing on the top plan (the first plan P1) being displayed on the first display section 24 and the second display section 26.

More specifically, as illustrated in FIG. 5B, in the specific display area 24B of the display area 24A of the first display section 24 the display density of the first plan P1 whose action has started is gradually lowered and the first plan P1 disappears.

Similarly, as illustrated in FIG. 5A, in the specific display area 26B of the display area 26A of the second display section 26 the display density of the first plan P1 whose action has started is gradually lowered and the first plan P1 disappears.

Then continuing at step S112, the CPU 30 uses the functionality of the first display instruction section 56 to move the second plan P2 and the third plan P3 respectively downward (toward the position where the top plan had been displayed) inside the specific display area 24B from the state of FIG. 5B, as illustrated in FIG. 6B. When doing so the functionality of the emphasis display section 60 is used to display the second plan P2 that has been moved to the position of the top plan slightly enlarged.

Similarly, the CPU 30 uses the functionality of the second display instruction section 58 to move the second plan P2 downward from the state of FIG. 5A, as illustrated in FIG. 6A. When doing so the functionality of the emphasis display section 60 is used to display the second plan P2 that has been moved to the position of the top plan enlarged.

Furthermore, at step S114 the CPU 30 uses the functionality of the second determination section 64 to determine whether or not there is a plan not yet displayed in the specific display area 24B of the first display section 24 (an additional plan). Processing transitions to step S116 in cases in which affirmative determination is made, and processing transitions to step S118 in cases in which negative determination is made.

At step S116 the CPU 30 uses the functionality of the first display instruction section 56 to perform the fade-in processing of the fourth plan P4, which is an additional plan having the earliest scheduled execution among the plans not yet displayed, as illustrated in FIG. 6B and FIG. 7B. More specifically, in the specific display area 24B of the display area 24A, the display density of the fourth plan P4 positioned above the third plan P3 is gradually raised to the display density of the other plans (the second plan P2, and the third plan P3), so as to display the fourth plan P4 above the third plan P3. Namely, as illustrated in FIG. 7B, the three plans with the earliest scheduled execution (the second plan P2, the third plan P3, and the fourth plan P4) for the current position of the vehicle 12 are displayed (this results in the plans displayed in the specific display area 24B being updated).

Similarly, as illustrated in FIG. 6A and FIG. 7A the CPU 30 uses the functionality of the second display instruction section 58 to gradually raise the display density of the third plan P3 at a position where the third plan P3 has been added above the second plan P2 in the specific display area 26B of the display area 26A, to the display density of the other plan (the second plan P2), so as to display the third plan P3 above the second plan P2. Namely, as illustrated in FIG. 7A, the two plans (the second plan P2 and the third plan P3) having the earliest scheduled execution for the current position of the vehicle 12 are displayed (this results in the plans displayed in the specific display area 26B being updated).

Note that in cases in which negative determination is made at step S114 the CPU 30 uses the functionality of the second determination section 64 at step S118 to determine whether or not there are plural plans displayed in the first display section (the specific display area 24B).

This is done because in such cases, due to the number of plans displayed in the specific display area 26B of the second display section 26 (two in the present exemplary embodiment) being less than the number of plans displayed in the specific display area 24B of the first display section 24 (three in the present exemplary embodiment), even if there is no additional plan for the first display section 24, an additional plan for the second display section 26 would exist as long as there are plural plans displayed in the first display section 24.

Thus in cases in which affirmative determination is made at step S118, at step S120 the CPU 30 uses the functionality of the second display instruction section 58 to perform fade-in processing for the third plan P3 to be added only in the second display section 26. More specifically, for the third plan P3 to be added in the specific display area 26B of the display area 26A, the display density of the third plan P3 is gradually raised at a position above the second plan P2 to the display density of the other plan (the second plan P2), so as to display the third plan P3 above the second plan P2. Namely, as illustrated in FIG. 7A, the two plans having the earliest scheduled execution (the second plan P2 and the third plan P3) for the current position of the vehicle 12 are displayed (this results in the plan displayed in the specific display area 26B being updated).

Note that the CPU 30 transitions to step S122 in cases in which negative determination is made at step S118.

Continuing at step S122, the CPU 30 determines whether or not there is a plan for scheduled execution remaining in the first display section 24 (the specific display area 24B). Plan display processing needs to be performed when affirmative determination has been made at step S122, and so processing returns to step S108.

Display processing is ended in cases in which negative determination is made at step S122 since there is no plan displayed in the specific display areas 24B, 26B of the first display section 24 and the second display section 26.

In this manner, in the vehicle display device 10 according to the present exemplary embodiment, fade-out processing is performed on the top plan for which action has started (for example the first plan P1) in the first display section 24 and the second display section 26. More specifically, the display density of the top plan (for example the first plan P1) is gradually lowered in the specific display area 24B of the display area 24A of the first display section 24 and in the specific display area 26B of the display area 26A of the second display section 26, and the top plan disappears.

Thus to get the top plan (for example the first plan P1) being displayed in the specific display areas 24B, 26B of the first display section 24 and the second display section 26 to disappear, the fade-out processing is performed (the display density of the top plan is gradually lowered in the specific display areas 24B, 26B until disappearing) in this manner. The occupant in the driving seat is thereby able to ascertain with certainty that the top plan has disappeared from the first display section 24 and the second display section 26.

Thus, for example, even in cases in which plans that are the same (same type) (for example a vehicle lane change toward the right vehicle lane) are displayed in succession in the specific display area 24B of the first display section 24 or the specific display area 26B of the second display section 26, a situation in which the occupant is not able to ascertain that the display of the plans has been updated (the top plan has disappeared) is able to be prevented or suppressed from occurring.

Moreover, when the display of the plans in the specific display area 24B, 26B of the first display section 24 or the second display section 26 is being updated, after moving the top action plan (causing it to disappear) the remaining plans are moved (slid) downward (each lowered by one row), and the additional plan is additionally displayed using fade-in processing (gradually raising the display density of the plan). This enables the occupant to ascertain with certainty that the plan has been added (that the plan display has been updated).

Furthermore, the first display section 24 is disposed at an upper portion of the instrument panel 14 in front of the occupant of the driving seat, and the second display section 26 is disposed on the windshield glass 18 in front of the occupant of the driving seat. Thus updating of the plans displayed in the specific display areas 24B, 26B of the first display section 24 and the second display section 26 is able to be seen without the occupant of the driving seat needing to shift gaze much. Namely, the occupant of the driving seat is able to see the plan updating easily.

Furthermore, the vehicle 12 includes the vehicle display device 10 as described, and so the occupant is able to ascertain the scheduled execution sequence of the plans (actions (vehicle lane change and vehicle lane merging etc.)) for scheduled execution easily, and is able to ascertain with certainty that the display of the plans has been updated.

First Variation

Figure 10A:
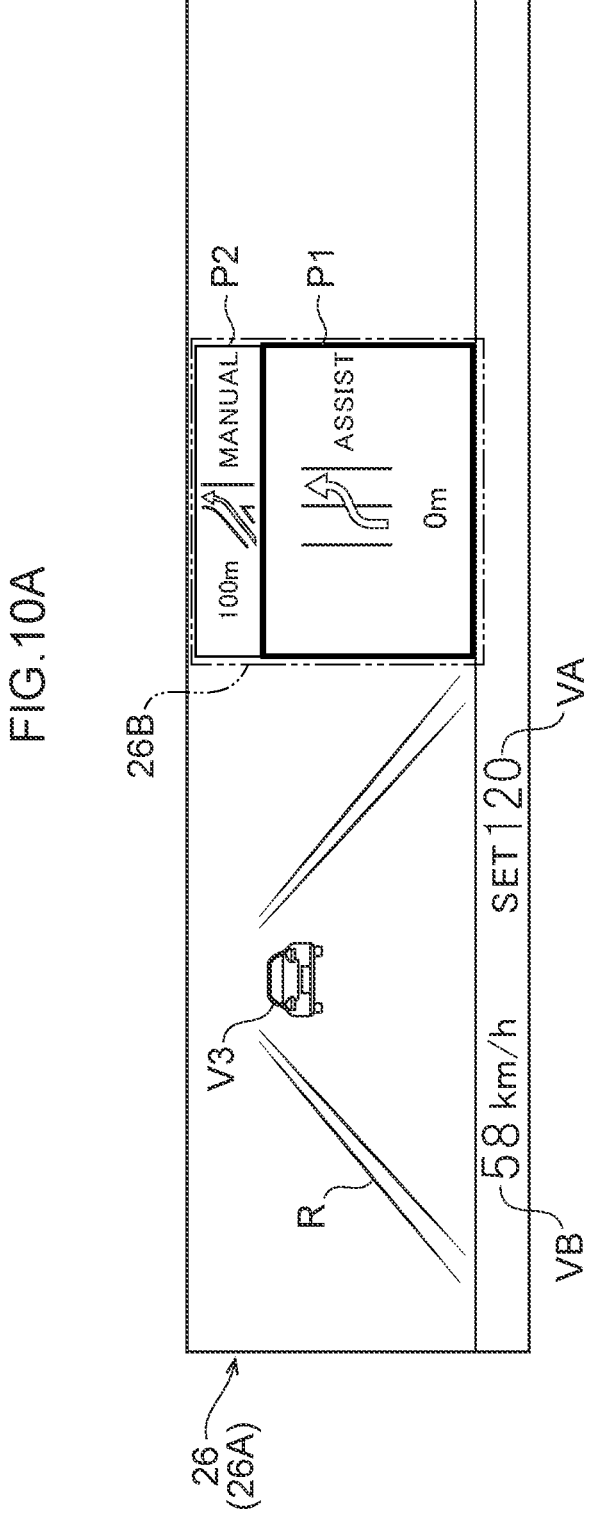
FIG. 10A is a diagram illustrating a display example during emphasis-display processing on the second display section in a first variation of the first exemplary embodiment in a state 100 m onwards from the state of FIG. 4A.
Figure 10B:
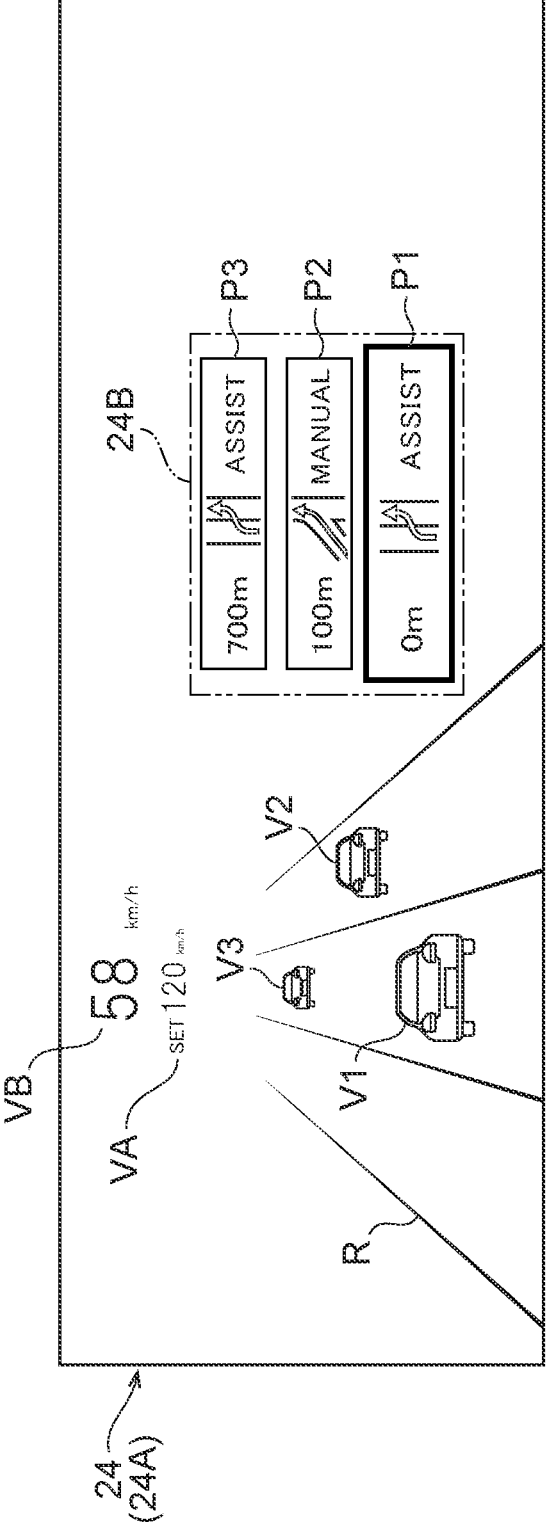
FIG. 10B is a diagram illustrating a display example of emphasis-display processing on the first display section in the first variation of the first exemplary embodiment in a state 100 m onwards from the state of FIG. 4B.

Explanation follows regarding a vehicle display device 10A of a first variation of the present exemplary embodiment. The only difference to the first exemplary embodiment is in the way in which the fade-out processing of the top plan is performed, and so explanation follows regarding this point alone, with reference to FIGS. 10A and 10B.

In the vehicle display device 10A according to the first variation, the action of the first plan P1 that is the top plan is started, and the first plan P1 subjected to the fade-out processing on the specific display area 24B of the display area 24A of the first display section 24 is emphasis-displayed (for example subjected to flashing processing (see the bold line section of the first display section 24 in FIG. 10)) prior to fade-out processing.

Note that in vehicle display device 10A of the first variation, similarly to in the first exemplary embodiment, the first plan P1, which is the top plan in the specific display areas 24B, 26B in the first display section 24 and the second display section 26, is already displayed enlarged, and so emphasis-display in this case means some sort of emphasis-display other than enlargement-display. However, in cases in which, as in the first exemplary embodiment, the first plan P1 that is the top plan is not being displayed enlarged such emphasis display would also encompass enlargement-display.

The occupant is accordingly able to ascertain that the action of the first plan P1 has started (is being executed), and the disappearance of the display of the first plan P1, with more certainty.

Second Variation

Explanation follows regarding a vehicle display device of a second variation of the present exemplary embodiment. A vehicle display device 10B according to a second variation as a functional configuration slightly differing from that of the vehicle display device 10, and display processing is also different therein. Explanation follows regarding these points of difference.

Figure 11:
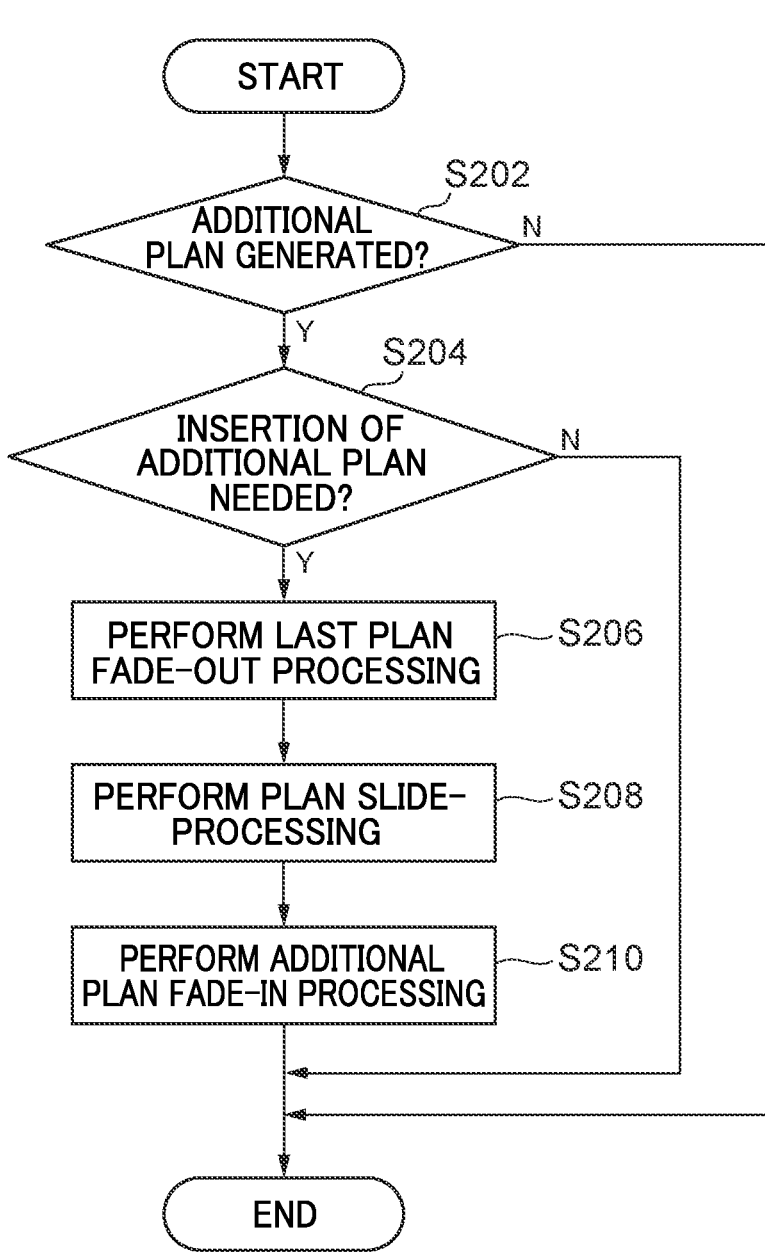
FIG. 11 is a flowchart illustrating an example of a flow of display processing in a vehicle display device of a second variation of the first exemplary embodiment.

Explanation follows regarding display processing in cases in which there is a need to add a different plan to the plans set in advance in the journey plan, for displaying such a plan (hereafter sometimes referred to as an "additional plan") by addition, with reference to the flowchart of FIG. 11 and to FIG. 12 to FIGS. 15A and 15B.

First explanation follows regarding a functional configuration of the vehicle display device 10B. The same reference numerals are appended to the same configuration elements to those of the functional configuration of the vehicle display device 10 of the first exemplary embodiment, and detailed explanation thereof will be omitted.

As illustrated in FIG. 12, the vehicle display device 10B includes a third determination section 66. The third determination section 66 includes functionality to determine whether or not there is a new plan (additional plan) generated by the journey plan setting section 52, and functionality to determine whether or not there is a need for insertion-display of the additional plan into each of the specific display areas 24B, 26B of the first display section 24 and the second display section 26.

More specifically, the third determination section 66 determines that an additional plan has been generated in cases in which a plan other than the initial plans has been added (generated) by the journey plan setting section 52. Moreover, in such cases the third determination section 66 determines whether or not there is a need for insertion-display in each of the specific display areas 24B, 26B by determining whether or not the scheduled execution sequence of the additional plan is anywhere in the sequence up to a number of plans (three in the present variation) for display in the specific display area 24B of the first display section 24, and anywhere in the sequence up to a number of plans (two in the present variation) for display in the specific display area 26B of the second display section 26.

Operation

Display processing is performed in the following manner in the vehicle display device 10B.

First at step S202 the CPU 30 uses the functionality of the third determination section 66 to determine whether or not an additional plan has been generated by the journey plan setting section 52. More specifically, the CPU 30 uses the functionality of the journey plan setting section 52 to detected vehicle behavior (vehicle operation) not in the journey plan, to determine whether or not an additional plan is needed to accompany such vehicle behavior, and to generate such an additional plan when needed. The CPU 30 determines whether or not an additional plan has been generated in cases in which the generation of such an additional plan has been detected.

For example, in the state of FIG. 1, in cases in which a vehicle ahead (displayed by the image V3) has decelerated abruptly to cause the occupant of the vehicle 12 to manually perform a vehicle lane change to the left side of the ego vehicle (displayed by the image V1) on the vehicle 12, then this gives rise to a need to add a lane change toward the right side in order to return to the original lane. An additional plan (a vehicle lane changes toward the right vehicle lane) is generated in such cases.

The CPU 30 ends processing when negative determination is made at step S202.

When affirmative determination has been made at step S202, in continuation at step S204 the CPU 30 uses the functionality of the third determination section 66 to determine whether or not there is need to insert this plan (fifth plan P5) respectively into the specific display areas 24B, 26B of the first display section 24 and the second display section 26.

For example, display may be performed with normal fade-in processing (similarly to the step S116 of the flowchart of FIG. 9 (see FIG. 6B)) after the top plan (first plan P1) has disappeared when the additional plan is the fourth item onward in the scheduled execution sequence of the plans for scheduled execution.

For example, in cases in which the vehicle has changed vehicle lane to the left side manually and a vehicle lane change toward the right vehicle lane has been added as described above, there is a need to perform the vehicle lane change toward the right vehicle lane at least prior to the merging toward the right side (second plan P2). A scheduled execution distance of the fifth plan P5 that is the additional plan is accordingly set 150 m nearer than the scheduled execution distance 200 m of the second plan P2.

The CPU 30 uses the functionality of the third determination section 66 to determine the need for insertion prior to the second plan P2 because the scheduled execution distance of the fifth plan P5 that is the additional plan is a value smaller than the scheduled execution distance of the second plan P2.

The CPU 30 ends the display processing in cases in which negative determination has been made at step S204.

In cases in which affirmative determination has been made at step S204, at step S206 the CPU 30 performs fade-out processing on the plan displayed at the uppermost portion of each of the specific display areas 24B, 26B of the first display section 24 and the second display section 26, this plan having the latest scheduled execution (hereafter referred to as the "last plan").

Figure 13A:
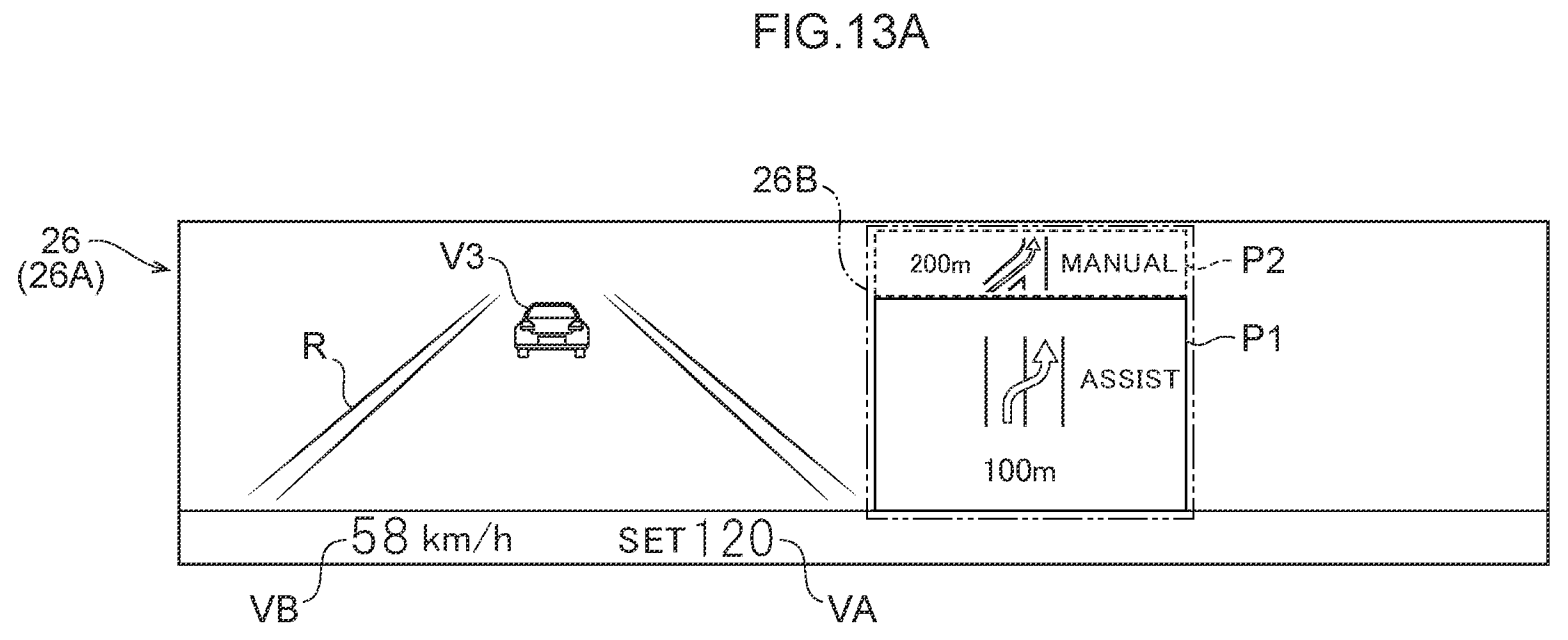
Figure 13B:
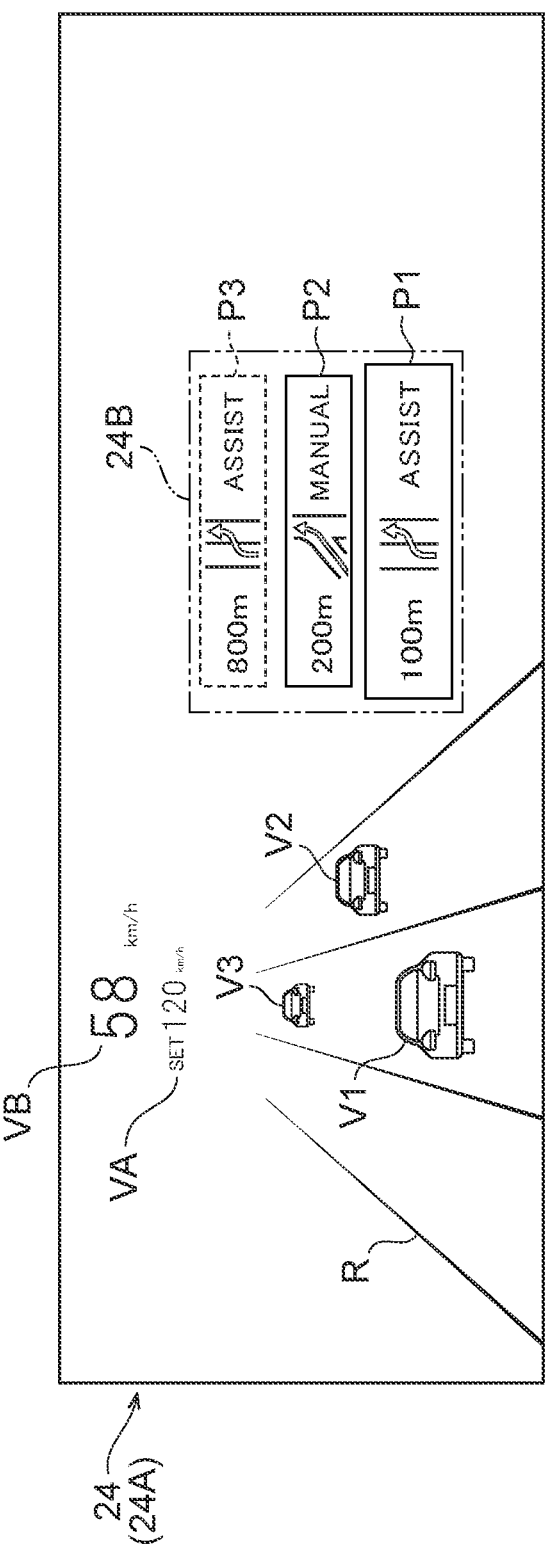
FIG. 13B is a diagram illustrating a display example on the first display section during fade-out processing in the state of FIG. 4B.

Namely, as illustrated in FIG. 13B, using the functionality of the first display instruction section 56, in the specific display area 24B of the display area 24A of the first display section 24 the display density for the third plan P3 that is the last plan is gradually lowered such that the third plan P3 disappears.

Similarly, as illustrated in FIG. 13A, the CPU 30 uses the functionality of the second display instruction section 58 to gradually lower the display density for the second plan P2 that is the last plan in the specific display area 26B of the display area 26A of the second display section 26 such that the second plan P2 disappears.

Next at step S208 the CPU 30 uses the functionality of the first display instruction section 56 and the second display instruction section 58 to perform slide-processing in cases in which there is display space above the insertion position of the additional plan in the specific display areas 24B, 26B.

Figure 14A:
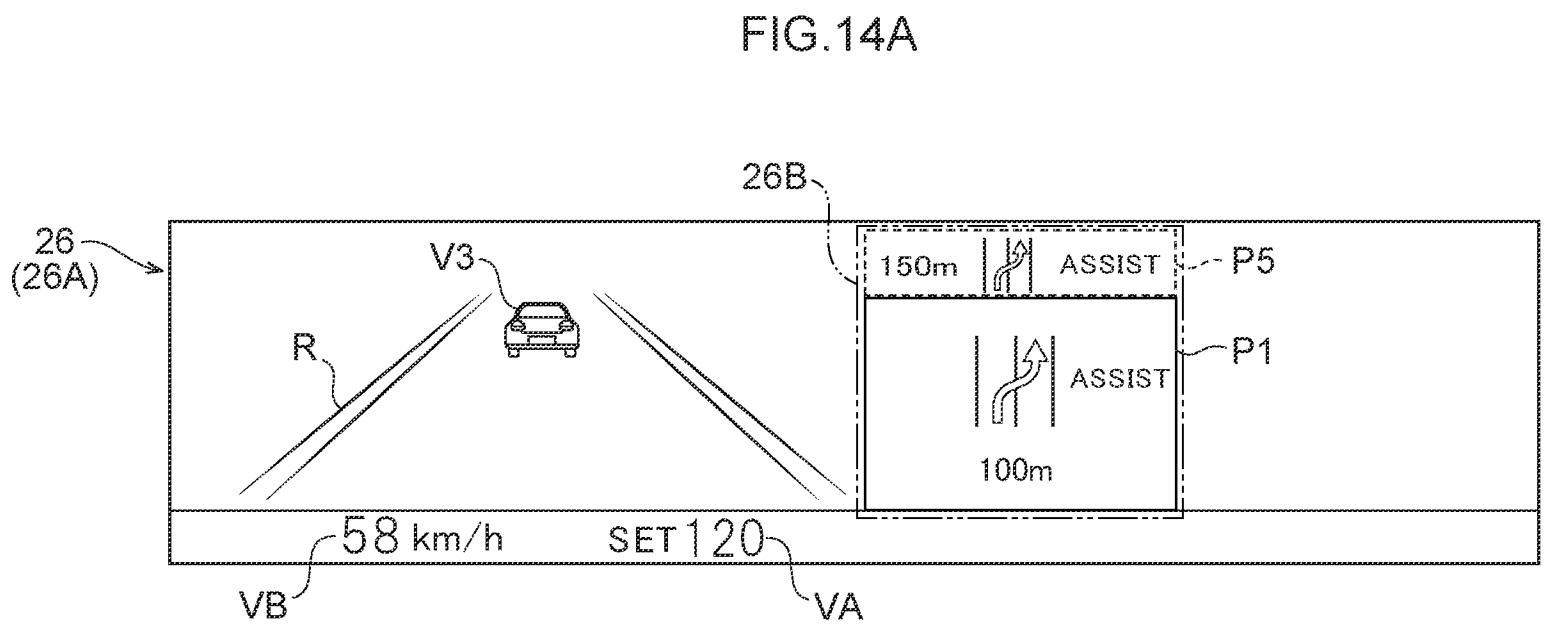
Figure 14B:
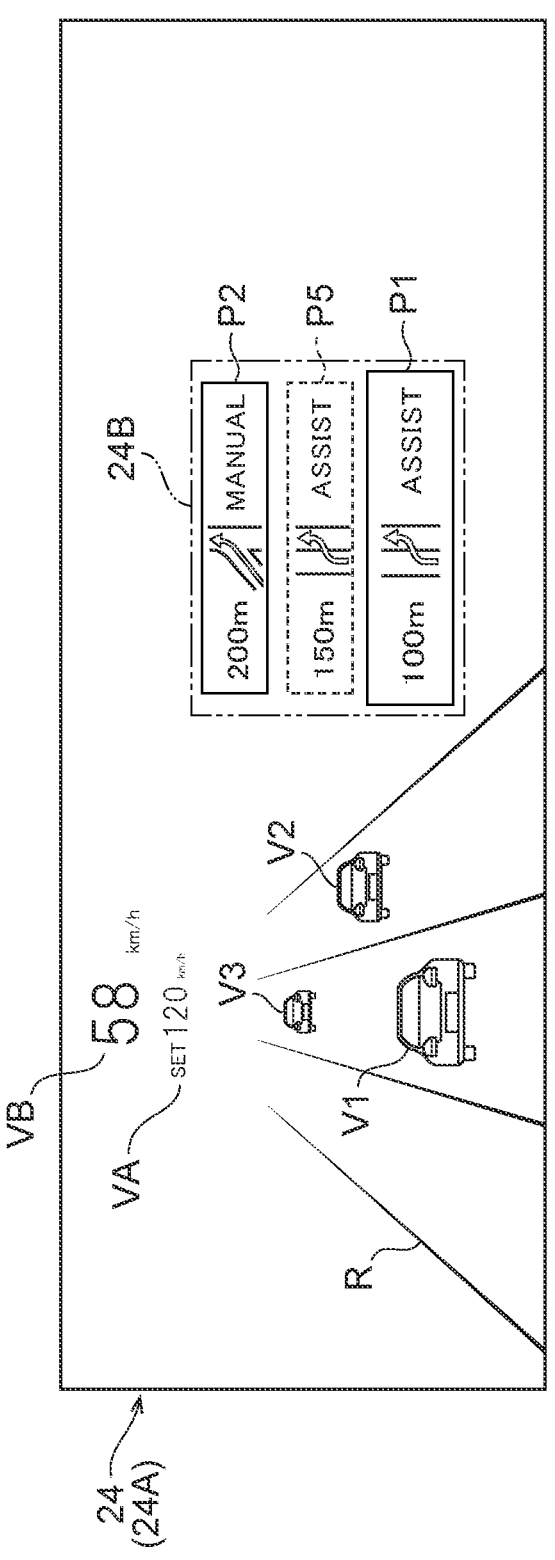
FIG. 14B is a diagram illustrating a display example on the first display section during fade-in processing in the state of FIG. 4B.

More specifically, as illustrated in FIG. 14B, the second plan P2, which is displayable in the specific display area 24B of the first display section 24 above the insertion position of the fifth plan P5, is moved upward.

Note that, as illustrated in FIG. 14A, in the second display section 26 slide-processing is not executed because there is no space to display another plan above the insertion position of the fifth plan P5 in the specific display area 26B.

In continuation at step S210 the CPU 30 performs the fade-in processing on the fifth plan P5 that is the additional plan.

Figure 15A:
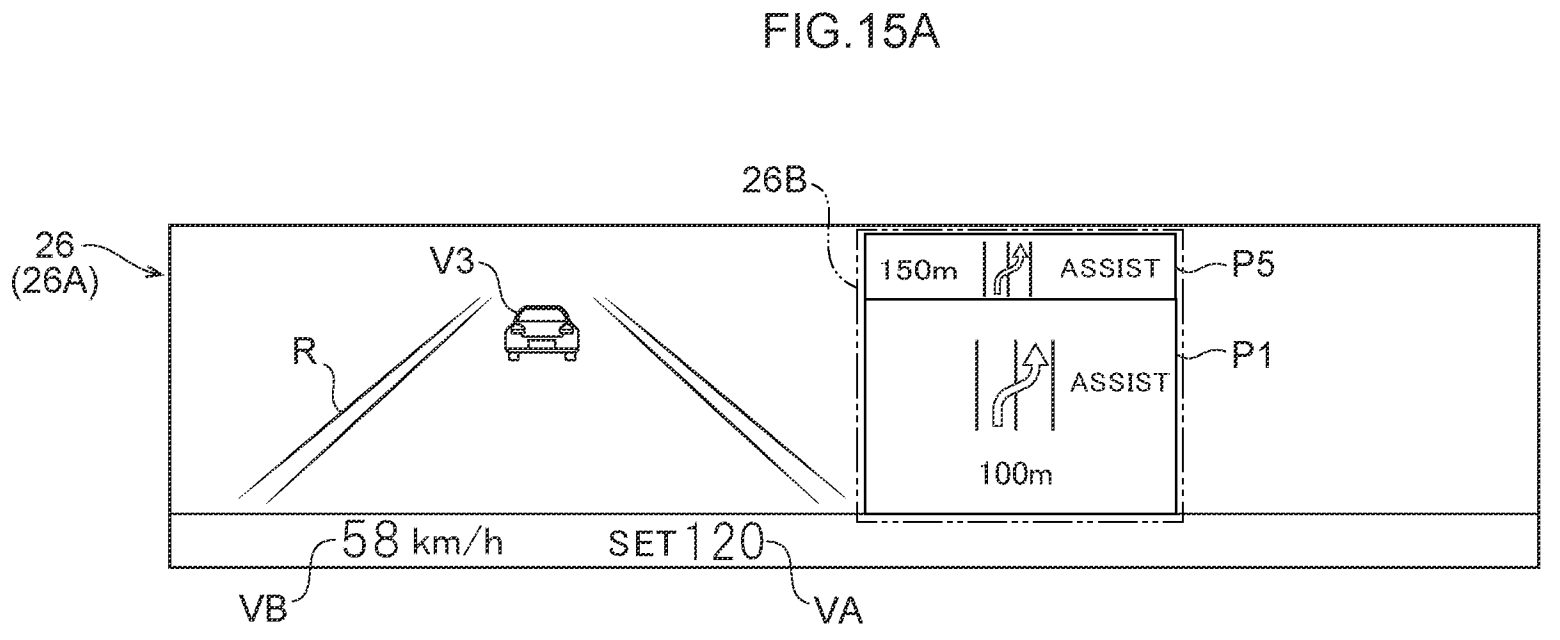
Figure 15B:
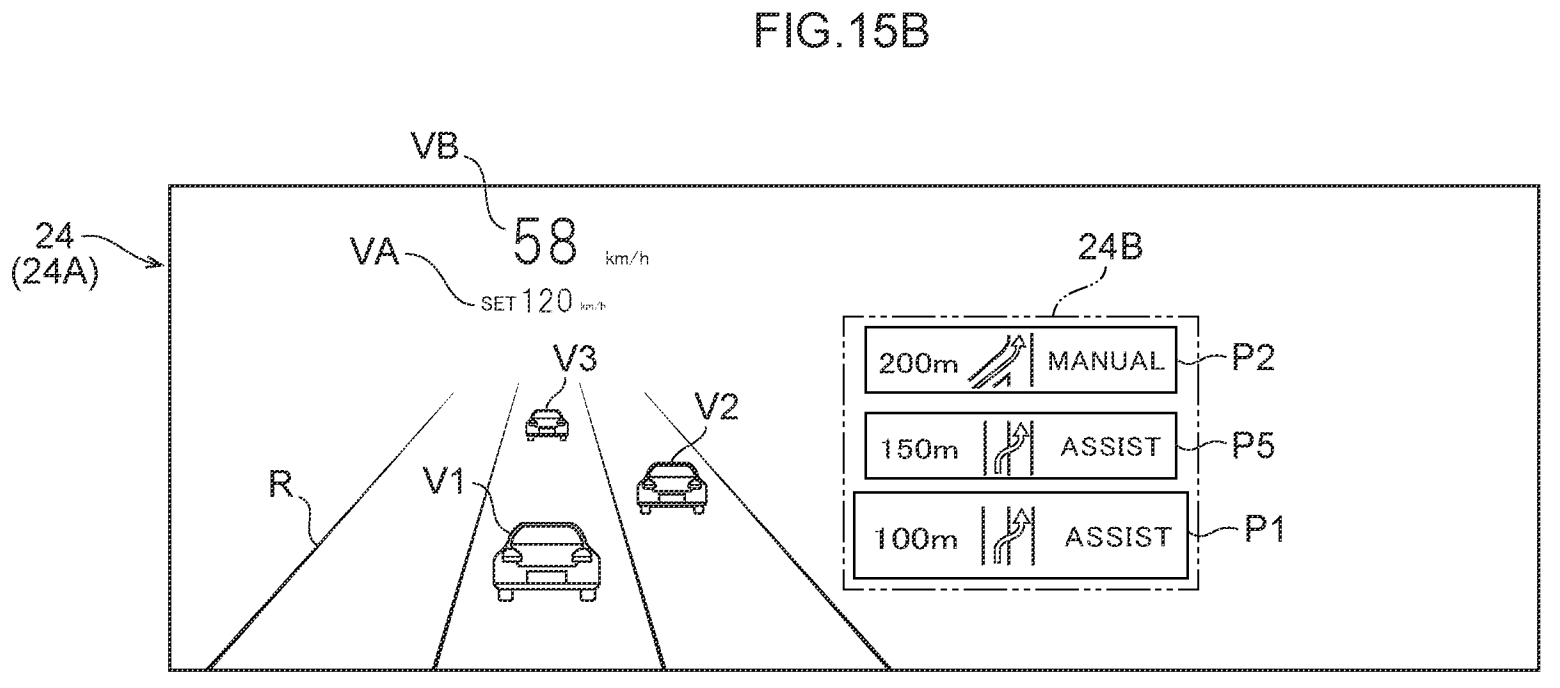

More specifically, as illustrated in FIG. 14B, the CPU 30 uses the functionality of the first display instruction section 56 to gradually raise the display density in the specific display area 24B of the display area 24A of the first display section 24 of the fifth plan P5 after sliding at a position between the first plan P1 and the second plan P2 to the display density of the other plans (first plan P1 and second plan P2). As illustrated in FIG. 15B, this results in the fifth plan P5 being inserted (displayed) in the specific display area 24B between the first plan P1 and the second plan P2.

Similarly, as illustrated in FIG. 14A, the CPU 30 uses functionality of the second display instruction section 58 to gradually raise the display density in the specific display area 26B of the display area 26A of the second display section 26 of the fifth plan P5 at a position above the first plan P1 to the display density of the other plan (first plan P1). As illustrated in FIG. 15A, this results in the fifth plan P5 being inserted (displayed) above the first plan P1 and within the specific display area 24B.

In this manner, in the vehicle display device 10B according to the second variation, in cases in which an additional plan is generated such as by the behavior of the vehicle (operation of the occupant), and the additional plan (for example the fifth plan P5) is inserted into the specific display area 24B of the first display section 24 and the specific display area 26B of the second display section 26, the last plans (third plan P3, second plan P2) are respectively caused to disappear from the specific display areas 24B, 26B by performing the fade-out processing, and the additional plan (fifth plan P5) is inserted in the specific display areas 24B, 26B by slide-processing (moving the second plan P2 to an upper portion), when necessary, and by fade-in processing.

This accordingly enables the occupant to ascertain with certainty that the last plan has disappeared from display and that the additional plan (fifth plan P5) has been inserted. Namely, the driver is able to ascertain with certainty that the plan has been added.

In particular, due to the additional plan (fifth plan P5) being inserted into the specific display areas 24B, 26B using fade-in processing, the occupant is able to clearly ascertain at which position insertion has been made in the plural plans being displayed.

Note that "insertion" of the additional plan does not only means insertion of the additional plan between plural plans but, as illustrated in FIG. 15A, also encompasses insertion at an end (position) of plural plans displayed in a row in the specific display areas 24B, 26B.

Second Exemplary Embodiment

Explanation follows regarding a vehicle display device 100 according to a second exemplary embodiment. The same reference numerals are appended to similar configuration elements to those of the vehicle display device 10 according to the first exemplary embodiment, and detailed explanation thereof will be omitted.

Moreover, difference to the vehicle display device 10 is merely in the method of display processing, and so only such portions will be explained with reference to the flowchart of FIG. 16 and FIGS. 17A and 17B.

The first half of the display processing in the vehicle display device 100 is absolutely the same as the display processing of the vehicle display device 10 (see FIG. 8), and so the flowchart of FIG. 8 should be substituted for such explanation. Moreover, in the flowchart of FIG. 16 the same step numerals are appended to similar steps to those in the display processing of the vehicle display device 10, and detailed explanation thereof will be omitted.

Figure 17A:
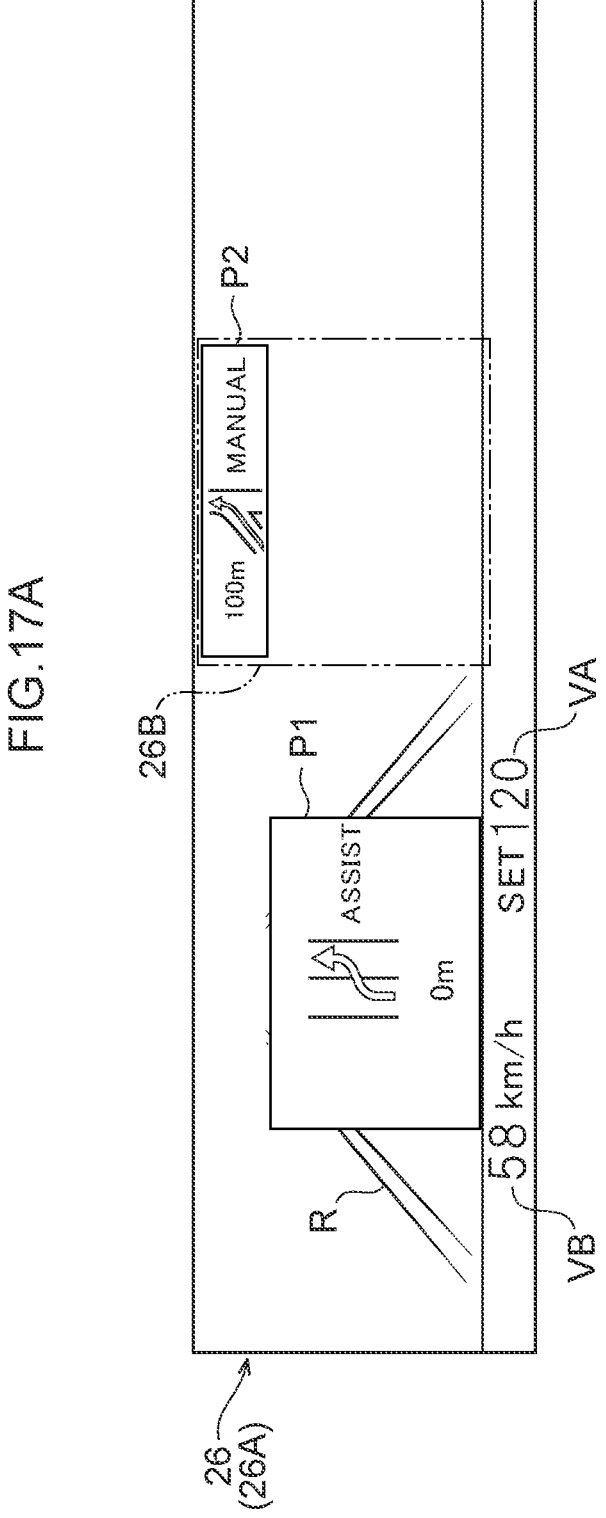
FIG. 17A is a diagram illustrating a display example for move-processing performed on the second display section in a state 100 m onwards from the state of FIG. 4A.
Figure 17B:
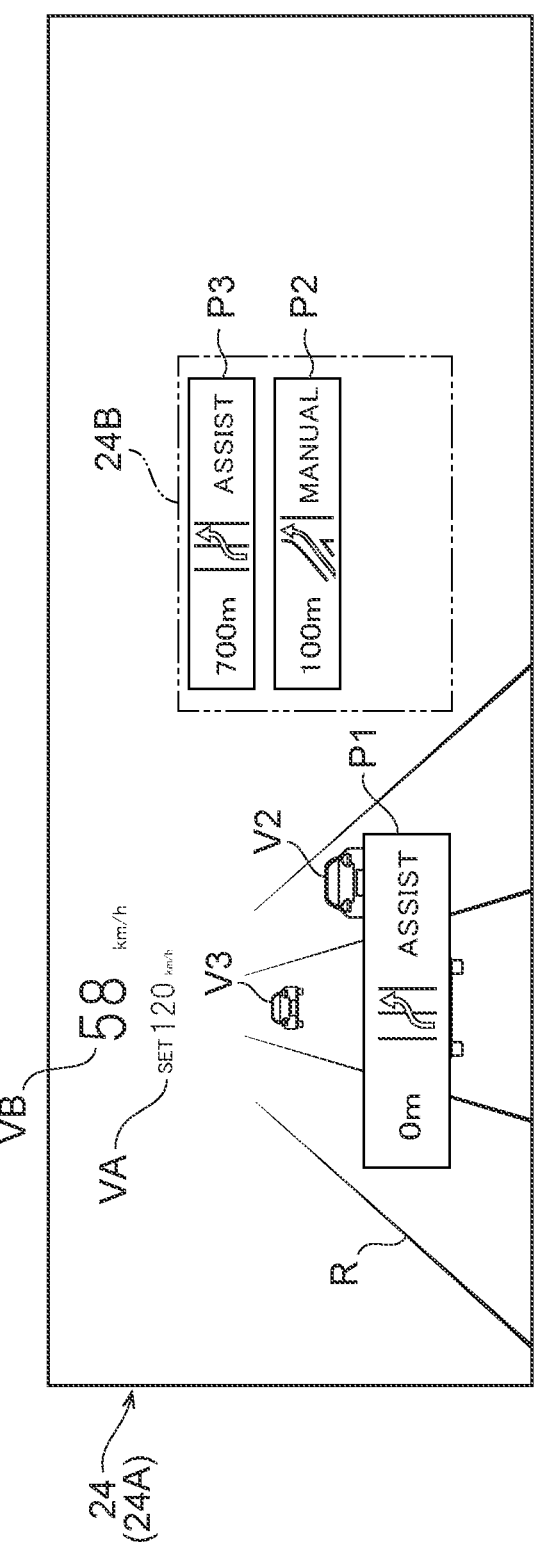
FIG. 17B is a diagram illustrating a display example for move-processing performed on a first display section in a state 100 m onwards from the state of FIG. 4B.

At step S108 (see FIG. 8) the CPU 30 determines whether or not the action of the top plan (first plan P1) has started, and at step S302 of FIG. 16 uses the functionality of the first display instruction section 56 and the second display instruction section 58 to move the first plans P1 respectively in the display areas 24A, 26A of the first display section 24 and the second display section 26 to the left side (outside) from the specific display areas 24B, 26B, so as to be positioned on the road image R (see FIG. 17A and FIG. 17B).

Next, at step S304, the CPU 30 uses the functionality of the first display instruction section 56 and the second display instruction section 58 to perform fade-out processing on the first plan P1 positioned on the road image R in the display area 24A of the first display section 24 and in the display area 26A of the second display section 26, such that they respectively disappear.

At the same time, the CPU 30 also moves (slides) remaining plans (the second plan P2 and the third plan P3, or the second plan P2) downward in each of the specific display areas 24B, 26B of the first display section 24 and the second display section 26, while also displaying an additional plan when an additional plan is present (the fourth plan P4 or the third plan P3) using fade-in processing so as to be displayed at the uppermost row of the specific display areas 24B, 26B (step S112 to step S116).

The vehicle display device 100 that performs display processing in this manner thereby enables an occupant to ascertain with certainty a plan whose action is being executed due to the top plan (first plan P1) for which execution has been started being moved onto the road image R.

For example, in cases in which the top plan and the plan that is next scheduled for execution (i.e. second in scheduling) are the same type of plan (vehicle lane change toward the right vehicle lane), then updating by merely causing the top plan to disappear from the specific display areas 24B, 26B at the start of action and the next plan to be displayed would give rise to a concern that the occupant mistakes the plan for which action has started as being the next plan.

However, in the vehicle display device 100 the top plan (first plan P1) for which action has started is moved onto the road image R displayed in each of the display areas 24A, 26A of the first display section 24 and the second display section 26, enabling the occupant to ascertain with certainty which plan is the one whose action is being executed.

Note that the vehicle display device 100 exhibits similar operation and advantageous effects to those of the vehicle display device 10.

Other

Although explanation has been given regarding vehicle display devices and display processing methods according to exemplary embodiments, obviously various embodiments may be implemented within a range not departing from the spirit of the present disclosure. For example, in the above exemplary embodiments the first display section 24 is provided at the instrument panel 14 so as to be at the vehicle front side of the driving seat, and the second display section 26 is configured by the projection surface projected onto by the head up display device 44, there is no limitation thereto. Namely, the first display section may be a central display provided at a vehicle width direction central portion of the instrument panel 14. The second display section may be provided on the instrument panel 14 so as to be at the vehicle front side of the steering wheel 16.

Moreover, in the first exemplary embodiment (including the first and second variations (similar applies hereafter)) and the second exemplary embodiment, the top plan was enlargement-displayed in the specific display areas 24B, 26B of the first display section 24 and the second display section 26 using the functionality of the emphasis display section 60, however this is not essential. Namely, all of plural plans may be displayed at the same size in the specific display areas 24B, 26B of the first display section 24 and the second display section 26.

Furthermore, although in the first variation of the first exemplary embodiment the top plan was emphasis-displayed by flashing-display when the fade-out processing was performed on the top plan, there is no limitation thereto and emphasis-display may be performed by another method. For example, emphasis-display may be performed by changing the color, tone, or the like. Moreover, emphasis-display may be performed by a method such as raising the brightness of the plan. In cases in which all of plural plans are displayed at the same size in the specific display areas 24B, 26B of the first display section 24 and the second display section 26 (i.e. the top plan is not enlargement-displayed), then emphasis-display may be performed by enlargement-display of the top plan when the top plan is being subjected to fade-out processing.

Furthermore, although in the above exemplary embodiment, three items of information, these being the distance until the action of the vehicle 12, the scheduled travel path of the vehicle, and the driving category, are displayed for each plan, there is no limitation thereto. For example, information such as the speed limit may also be displayed. However, from the perspective of the ease of viewing of the display, display is preferably limited to only the three items of information mentioned above. Moreover, display of the scheduled travel path is not limited to the graphic representations illustrated in FIGS. 4A and 4B to FIGS. 6A and 6B, and display may be performed using other icons or the like.

Moreover, although in the above exemplary embodiment, the second display instruction section 58 displays two imminent plans on the second display section 26, there is no limitation thereto. For example, the second display instruction section 58 may display three or more imminent plans on the second display section 26.

Furthermore, although in the exemplary embodiment described above there are plural plans displayed from below to above in scheduled execution sequence in the specific display areas 24B, 26B of the first display section 24 and the second display section 26, there is no limitation to this direction. For example, plural plans may be displayed from above to below in scheduled execution sequence in the specific display areas 24B, 26B of the first display section 24 and the second display section 26.

Furthermore, although in the exemplary embodiment described above there are plural plans displayed in the display areas 24A, 26A of the first display section 24 and the second display section 26, a configuration may be adopted in which only the imminent top plan is displayed in the second display section 26.

Furthermore, although in the exemplary embodiment described above fade-out processing, slide-processing, and fade-in processing is performed on the plans in the display areas 24A, 26A of the first display section 24 and the second display section 26 a configuration may be adopted in which such processing is executed in only one of the first display section 24 and the second display section 26. Moreover, only the fade-out processing on the top plan is essential in the first display section 24 and the second display section 26, and the slide-processing and the fade-in processing of the additional plan may be omitted.

Although in a series of the exemplary embodiments fade-out processing of gradually lowering the display density of a plan in the specific display areas 24B, 26B to cause the top plan to disappear is described as image display processing, there is no limitation thereto. For example, processing may be performed to move a plan inside the display areas 24A, 26A so as to move outside the specific display areas 24B, 26B and then to cause the top plan to disappear. In such cases the display density of the plan may be gradually lowered during movement, or a configuration may be adopted in which movement is performed at a constant display density, and then the plan is caused to disappear after movement.

Similarly for fade-in processing, although gradually raising the display density of a plan inside the specific display areas 24B, 26B so as to be displayed is described as image display processing, there is no limitation. For example, processing may be performed to move a plan displayed inside the display areas 24A, 26A but outside of the specific display areas 24B, 26B, so as to be inside the specific display areas 24B, 26B. In such cases the display density of the plan may be gradually raised during movement, or the display density may be constant during movement.

For the first exemplary embodiment in cases in which fade-out processing is being performed on the first plan P1 that is the top plan, a conceivably approach is for the first plan P1 to be caused to disappear after being moved to the right side from the specific display area 24B in the display area 24A, as illustrated in FIG. 18B. Similarly, in cases in which fade-in processing is being performed on the fourth plan P4 that is the additional plan, a conceivably approach is for the fourth plan P4 to be caused to disappear after being moved to the right side from the specific display area 24B in the display area 24A, as illustrated in FIG. 19B.

Figure 18A:
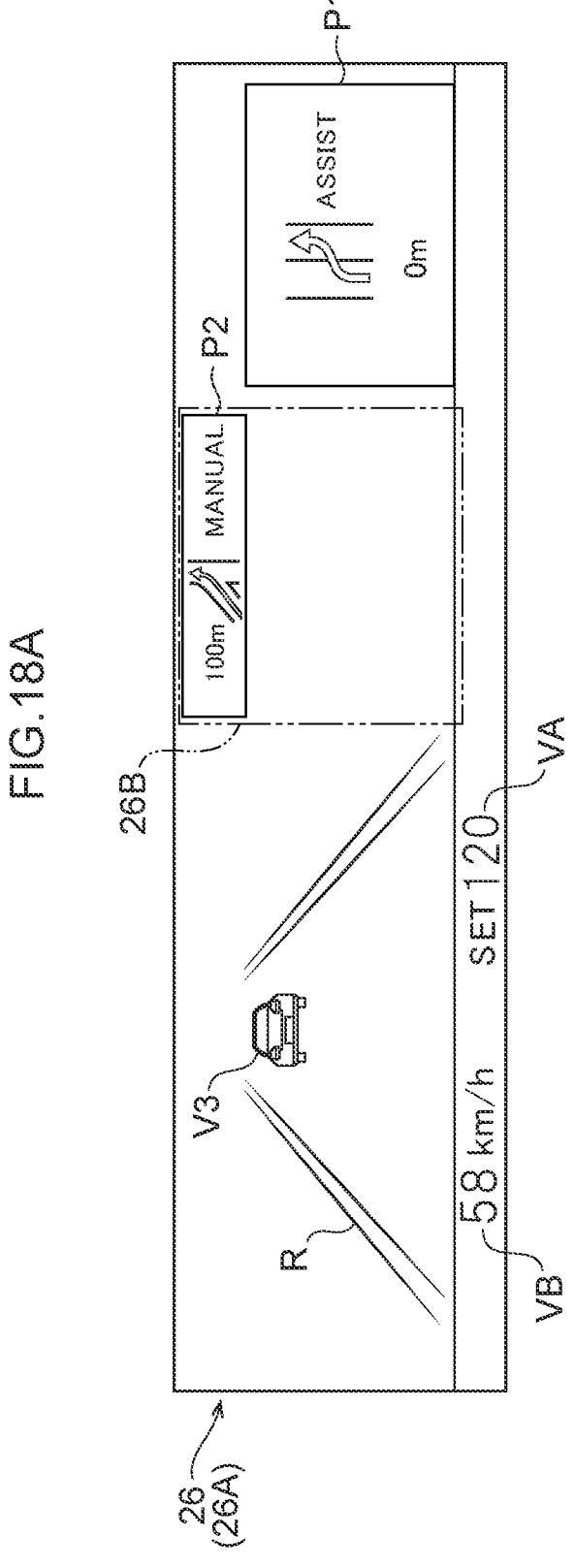
FIG. 18A is an explanatory diagram regarding fade-out processing according to another example.
Figure 18B:
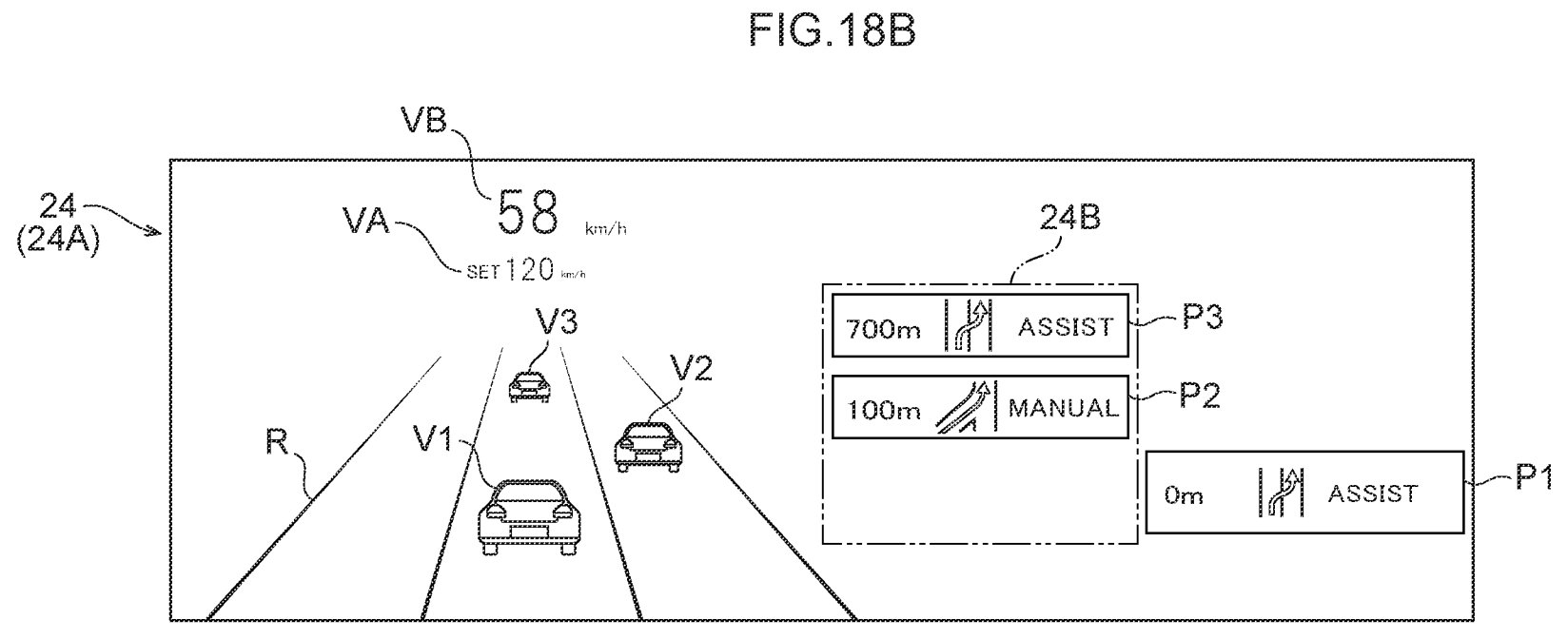
Figure 19A:
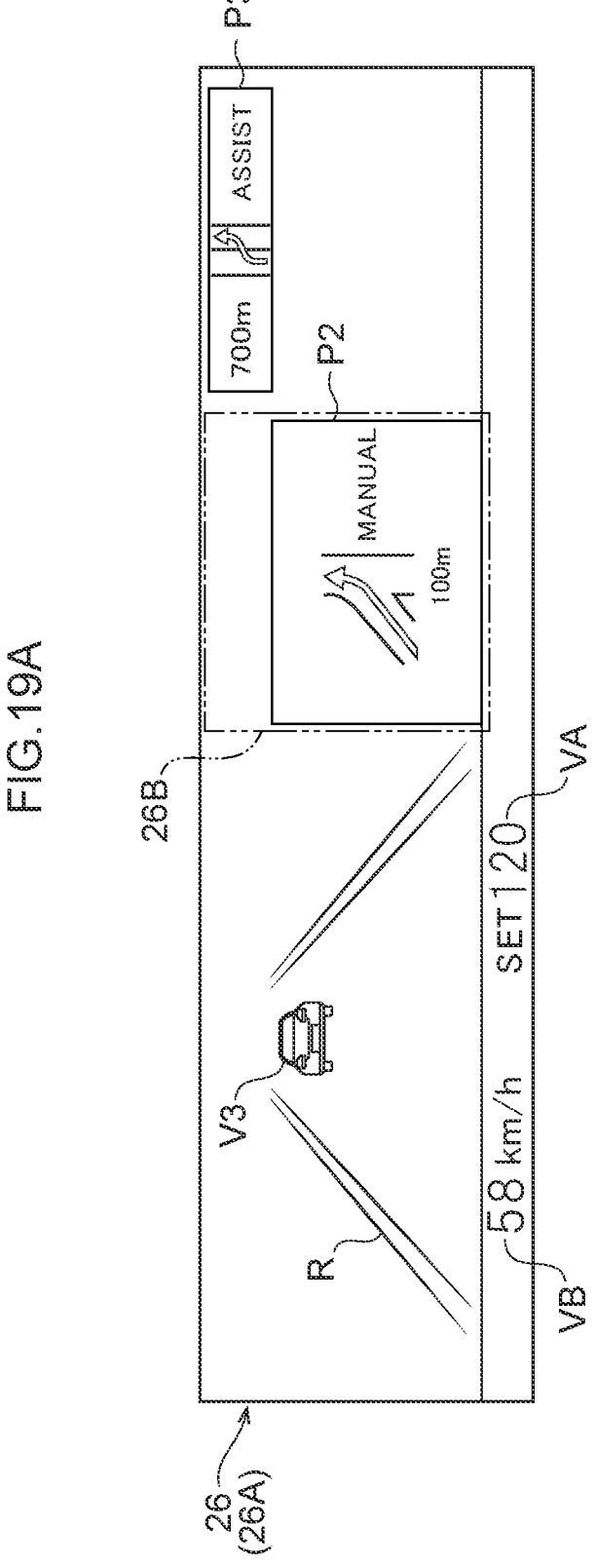
FIG. 19A is an explanatory diagram regarding fade-in processing according to another example.
Figure 19B:
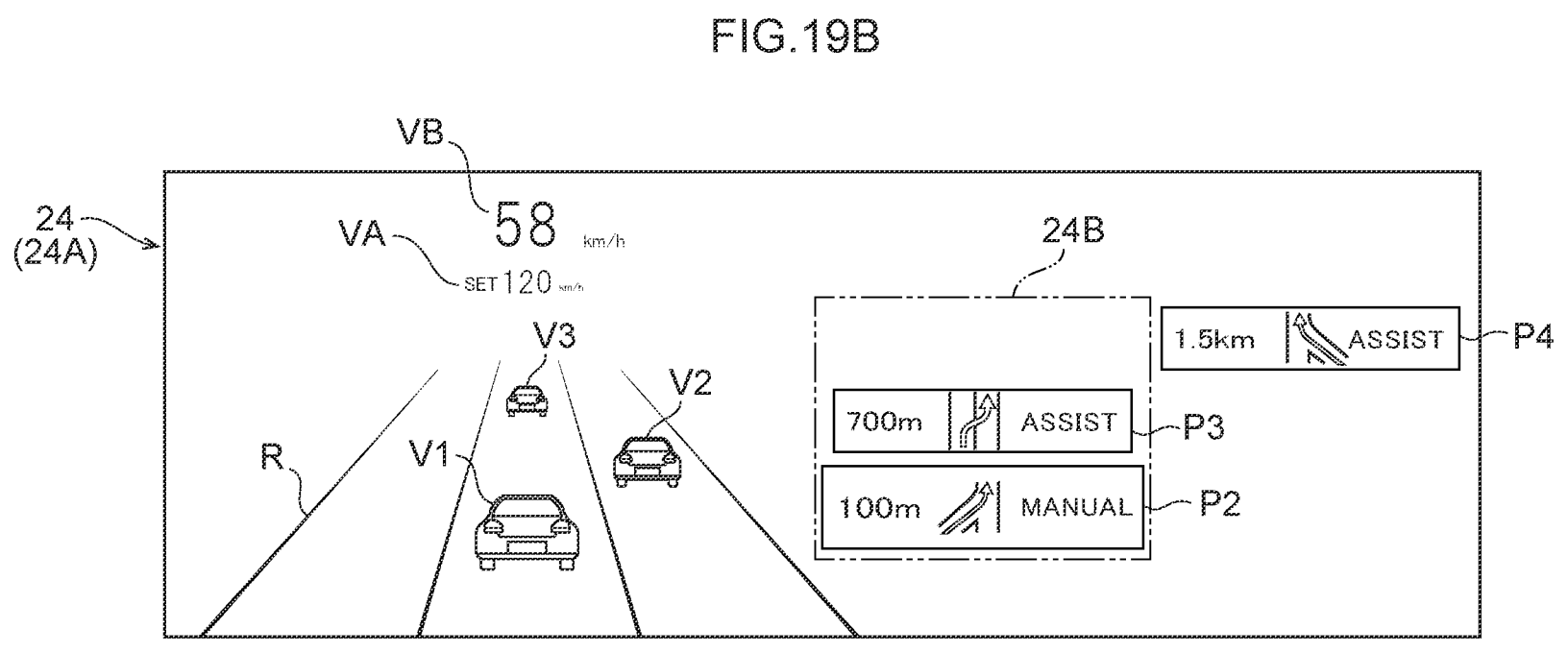

As illustrated in FIG. 18A and FIG. 19A, a conceivably approach is to execute image display processing in the second display section 26 similarly to in the first display section 24.

Although in the vehicle display device of the first exemplary embodiment and the second exemplary embodiment fade-out processing of the top plan was started at an action start timing of the top plan, the start condition for the fade-out processing of the top plan is not limited thereto. For example, the start condition for the fade-out processing of the top plan may be an action complete timing of the top plan, or may be a timing when the vehicle 12 passes the scheduled execution position thereof. The start condition for the fade-out processing is not particularly limited as long as it is a condition related to the top plan. Note that the start condition referred to here corresponds to the "prescribed condition".

Moreover, although in the explanatory diagrams for the first exemplary embodiment and the second exemplary embodiment the fade-out processing is described as starting at the scheduled execution position of the top plan (0 m), there is no limitation thereto. For example, when flashing of a direction indicator starts prior to the scheduled execution position for a first plan P1 of a vehicle lane change toward the right vehicle lane, the fade-out processing may be started from the flashing start position (flashing start time) of the direction indicator.

Moreover, although in a series of the exemplary embodiments for simplicity of explanation the fade-out processing, slide-processing, and fade-in processing for plans have been described as being performed at different respective timings in the display areas 24A, 26A of the first display section 24 and the second display section 26, such processing may be performed at the same time.

Although in a series of the exemplary embodiments for simplicity of explanation the fade-out processing is illustrated by a plan being moved while still at a constant display density to outside of the specific display areas 24B, 26B and then caused to disappear, processing may be adopted in which the density is made more feint while the plan is being moved so as to disappear.

Note that the road conditions and the type and distances etc. of the plans as displayed on the screen are strictly merely for ease of explanation, and there are cases in which they do not match the actual road conditions.

Note that the display processing executed by the CPU 30 reading and executing software (a program) in the above exemplary embodiment may be executed by various types of processor other than the CPU 30. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Furthermore, although in the above exemplary embodiment a configuration is adopted in which various data is stored in the storage 36, there is no limitation thereto. A non-transitory recording medium such a compact disc (CD), a digital versatile disc (DVD), or universal serial bus (USB) memory may serve as a storage section. In such cases, the various programs, data, and so on are stored on the non-transitory recording medium.

What is claimed is:

1. A vehicle display device comprising:
a display section provided inside a vehicle cabin of a vehicle and including a display area capable of displaying an image; and
a control section including a memory and a processor coupled to the memory, wherein the processor is configured to:
cause a plurality of plans scheduled for execution by the vehicle to be displayed in the display area in a row in a scheduled execution time sequence, the plurality of plans being related to traveling of the vehicle, each of the plurality of plans showing a lane change of the vehicle or showing a merge of the vehicle into a vehicle lane, and
when an action of a top plan that is a plan having an earliest scheduled execution time among the plurality of plans is started, (i) cause the top plan to move out of the scheduled execution time sequence and move to a portion of the display area that is different from and adjacent to a location of the scheduled execution time sequence, and (ii) after the top plan has moved to the portion of the display area that is different from and adjacent to the location of the scheduled execution time sequence, cause the top plan to disappear from the portion of the display area that is different from and adjacent to the location of the scheduled execution time sequence by fade-out processing while continuing to display the plurality of plans other than the top plan in the location of the scheduled execution time sequence in the display area.

2. The vehicle display device of claim 1, wherein the processor is configured to, when the top plan has been caused to disappear, move any of the plurality of plans other than the top plan toward a position where the top plan was displayed in the scheduled execution time sequence of the display area.

3. The vehicle display device of claim 1, wherein the processor is configured to add an additional plan that is a plan different from the plurality of plans so as to be displayed in the display area in the scheduled execution time sequence.

4. The vehicle display device of claim 3, wherein the processor is configured to cause the additional plan to be displayed in the display area using fade-in processing when causing the additional plan to be displayed in the display area.

5. The vehicle display device of claim 1, wherein the processor is configured to perform emphasis-display prior to the plan being caused to move out of the scheduled execution time sequence.

6. The vehicle display device of claim 1, wherein the display section is provided at an instrument panel at a vehicle front side of a driving seat of the vehicle.

7. The vehicle display device of claim 1, wherein the display section is a projection surface projected onto by a head up display device of the vehicle.

8. A vehicle comprising the vehicle display device of claim 1.

9. A display processing method executed by a processor to cause a plurality of plans scheduled for execution by a vehicle to be displayed in a display area of a display section provided inside a vehicle cabin of the vehicle by displaying the plurality of plans in a row in a scheduled execution time sequence, the plurality of plans being related to traveling of the vehicle, each of the plurality of plans showing a lane change of the vehicle or showing a merge of the vehicle into a vehicle lane, the display processing method comprising:
when an action of a top plan that is a plan having an earliest scheduled execution time among the plurality of plans is started, (i) causing the top plan to move out of the scheduled execution time sequence and move to a portion of the display area that is different from and adjacent to a location of the scheduled execution time sequence, and (ii) after the top plan has moved to the portion of the display area that is different from and adjacent to the location of the scheduled execution time sequence, causing the top plan to disappear from the portion of the display area that is different from and adjacent to the location of the scheduled execution time sequence by fade-out processing while continuing to display the plurality of plans other than the top plan in the location of the scheduled execution time sequence in the display area.

10. The display processing method of claim 9, further comprising, by the processor, when the top plan has been caused to disappear, moving any of the plurality of plans other than the top plan toward a position where the top plan was displayed in the scheduled execution time sequence of the display area.

11. The display processing method of claim 9, further comprising, by the processor, adding an additional plan that is a plan different from the plurality of plans so as to be displayed in the display area in the scheduled execution time sequence.

12. A non-transitory storage medium storing a program executable by a processor to perform display control processing to cause a plurality of plans scheduled for execution by a vehicle to be displayed in a display area of a display section provided inside a vehicle cabin of the vehicle by displaying the plurality of plans in a row in a scheduled execution time sequence, the plurality of plans being related to traveling of the vehicle, each of the plurality of plans showing a lane change of the vehicle or showing merge of the vehicle into a vehicle lane, the display control processing comprising:

when an action of a top plan that is a plan having an earliest scheduled execution time among the plurality of plans is started, (i) causing the top plan to move out of the scheduled execution time sequence and move to a portion of the display area that is different from and adjacent to a location of the scheduled execution time sequence, and (ii) after the top plan has moved to the portion of the display area that is different from and adjacent to the location of the scheduled execution time sequence, causing the top plan to disappear from the portion of the display area that is different from and adjacent to the location of the scheduled execution time sequence by fade-out processing while continuing to display the plurality of plans other than the top plan in the location of the scheduled execution time sequence in the display area.

13. The non-transitory storage medium of claim 12, wherein the display control processing further comprises, when the top plan has been caused to disappear, moving any of the plurality of plans other than the top plan toward a position where the top plan was displayed in the scheduled execution time sequence of the display area.

14. The non-transitory storage medium of claim 12, wherein the display control processing further comprises adding an additional plan that is a plan different from the plurality of plans so as to be displayed in the display area in the scheduled execution time sequence.

15. The vehicle display device of claim 1, wherein the top plan is moved to be positioned over a road image, which is an image depicting the road on which the vehicle is travelling and that is displayed in the display area.

16. The vehicle display device of claim 1, wherein the processor is configured to determine that the action of the top plan is started by detecting actuation of a flashing drive signal of a direction indicator of the vehicle.

17. The display processing method of claim 9, wherein the top plan is moved to be positioned over a road image, which is an image depicting the road on which the vehicle is travelling and that is displayed in the display area.

18. The display processing method of claim 9, wherein the processor determines that the action of the top plan is started by detecting actuation of a flashing drive signal of a direction indicator of the vehicle.

19. The non-transitory storage medium of claim 12, wherein the display control processing moves the top plan to be positioned over a road image, which is an image depicting the road on which the vehicle is travelling and that is displayed in the display area.

20. The non-transitory storage medium of claim 12, wherein the display control processing determines that the action of the top plan is started by detecting actuation of a flashing drive signal of a direction indicator of the vehicle.

\* \* \* \* \*